US012797787B2

(12) United States Patent
Martins Neves et al.

(10) Patent No.: US 12,797,787 B2
(45) Date of Patent: Nov. 17, 2026

(54) PROCESS FOR PREPARING A POLYBENZOXAZINE-DERIVED CARBON MEMBRANE, CARBON MEMBRANE, USE OF SAID MEMBRANE FOR SEPARATING INDUSTRIAL GASES AND PERMEATION MODULE

(71) Applicants: PETRÓLEO BRASILEIRO S.A.—PETROBRAS, Rio de Janeiro (BR); UNIVERSIDADE FEDERAL DO RIO GRANDE DO SUL—UFRGS, Porto Alegre (BR)

(72) Inventors: Thaís Martins Neves, Rio de Janeiro (BR); Raíssa De Araujo Serpa, Rio de Janeiro (BR); Raiane Valenti Gonçalves, Rio de Janeiro (BR); Nilson Romeu Marcilio, Rio de Janeiro (BR); Lucas Kirsch Schindel, Rio de Janeiro (BR); Isabel Cristina Tessaro, Rio de Janeiro (BR); Liliane Damaris Pollo, Rio de Janeiro (BR); Carlos Rene Klotz Rabello, Rio de Janeiro (BR); Augusto Mohr Christmann, Rio de Janeiro (BR); André Rodrigues Muniz, Rio de Janeiro (BR)

(73) Assignees: PETROLEO BRASILEIRO S.A.—PETROBRAS, Rio de Janeiro (BR); UNIVERSIDADE FEDERAL DO RIO GRANDE DO SUL—UFRGS, Porto Alegre (BR)

( * ) Notice: Subject to any disclaimer, the term of this patent is extended or adjusted under 35 U.S.C. 154(b) by 282 days.

(21) Appl. No.: 18/760,995

(22) Filed: Jul. 1, 2024

(65) Prior Publication Data

US 2025/0041793 A1 Feb. 6, 2025

(30) Foreign Application Priority Data

Jul. 31, 2023 (BR) .......................... 1020230153194

(51) Int. Cl.
*B01D 53/22* (2006.01)
*B01D 67/00* (2006.01)
(Continued)

(52) U.S. Cl.
CPC ....... *B01D 53/228* (2013.01); *B01D 67/0067* (2013.01); *B01D 67/0076* (2013.01);
(Continued)

(58) Field of Classification Search
CPC .............. B01D 53/228; B01D 67/0067; B01D 67/0076; B01D 67/0097; B01D 69/02;
(Continued)

(56) References Cited

U.S. PATENT DOCUMENTS

| | | | |
|---|---|---|---|
| 8,101,670 | B2 | 1/2012 | Liu et al. |
| 8,608,828 | B2 | 12/2013 | Voss et al. |

(Continued)

FOREIGN PATENT DOCUMENTS

| | | |
|---|---|---|
| BR | 102018009075 | 11/2019 |
| CN | 109748279 | 5/2019 |

(Continued)

OTHER PUBLICATIONS

Hao, G.; Li, W.; Qian, D.; Wang, G.; Zhang, W.; Zhang, T.; Wang, A.; Schuth, F.; Bongard, H.; Lu, A. Structurally Designed Synthesis of Mechanically Stable Poly(benzoxazine-co-resol)-Based Porous Carbon Monoliths and Their Application as High-Performance CO2 Capture Sorbents. Journal of the American Chemical Society, v. 133 (29), p. 11378-11388, 2011.

(Continued)

*Primary Examiner* — Frank M Lawrence, Jr.
(74) *Attorney, Agent, or Firm* — Womble Bond Dickinson (US) LLP

(57) ABSTRACT

The present disclosure describes a process of obtaining a carbon membrane derived from polymer polybenzoxazine, for improved separation of gases with different kinetic diameters such as helium (2.60 Å), hydrogen (2.89 Å), carbon dioxide (3,30 Å), oxygen (3.46 Å), nitrogen (3.64 Å), carbon monoxide (3.70 Å), methane (3.80 Å), ethylene (4.23
(Continued)

Å) and ethane (4.42 Å) from the molecular sieving mechanism.

39 Claims, 8 Drawing Sheets

(51) Int. Cl.
*B01D 69/02* (2006.01)
*B01D 69/06* (2006.01)
*B01D 71/02* (2006.01)
*B01D 69/10* (2006.01)

(52) U.S. Cl.
CPC ......... *B01D 67/0097* (2013.01); *B01D 69/02* (2013.01); *B01D 69/06* (2013.01); *B01D 71/021* (2013.01); *B01D 69/108* (2022.08); *B01D 2256/10* (2013.01); *B01D 2256/24* (2013.01); *B01D 2256/245* (2013.01); *B01D 2257/504* (2013.01); *B01D 2257/7022* (2013.01); *B01D 2323/081* (2022.08); *B01D 2323/082* (2022.08); *B01D 2323/10* (2013.01); *B01D 2323/12* (2013.01); *B01D 2323/14* (2013.01); *B01D 2323/219* (2022.08); *B01D 2323/28* (2013.01); *B01D 2323/30* (2013.01); *B01D 2325/02832* (2022.08); *B01D 2325/02833* (2022.08); *B01D 2325/20* (2013.01); *B01D 2325/22* (2013.01); *B01D 2325/24* (2013.01); *B01D 2325/30* (2013.01)

(58) Field of Classification Search
CPC .................. B01D 69/06; B01D 71/021; B01D 2256/10; B01D 2256/24; B01D 2256/245; B01D 2257/504; B01D 2257/7022; B01D 2323/081; B01D 2323/082; B01D 2323/10; B01D 2323/12; B01D 2323/14; B01D 2323/219; B01D 2323/28; B01D 2323/30; B01D 2325/02832; B01D 2325/02833; B01D 2325/20; B01D 2325/22; B01D 2325/24; B01D 2325/30; B01D 69/108; B01D 2325/02; B01D 2325/02831; B01D 71/62
USPC ........................................ 95/43–56; 96/4–14
See application file for complete search history.

(56) References Cited

U.S. PATENT DOCUMENTS

| | | | |
|---|---|---|---|
| 2007/0275285 A1 | 11/2007 | Choi et al. | |
| 2009/0117436 A1 | 5/2009 | Choi et al. | |
| 2009/0117440 A1 | 5/2009 | Choi et al. | |
| 2012/0070765 A1 | 3/2012 | Choi et al. | |

FOREIGN PATENT DOCUMENTS

| | | | |
|---|---|---|---|
| CN | 114538438 | 5/2022 | |
| WO | WO-2025012111 A1 * | 1/2025 | ........... B01D 61/362 |

OTHER PUBLICATIONS

Khan, M. M.; Halder, K.; Shishatskiy, S.; Filiz, V. Synthesis and Crosslinking of Polyether-Based Main Chain Benzoxazine Polymers and Their Gas Separation Performance. Polymers, v. 10 (2), p. 221, 2018.

Li, H.; Liu, Y. A review of polymer-derived carbon molecular sieve membranes for gas separation. New Carbon Materials, v. 37 (3), p. 484-507, 2022.

Manmuanpom, N.; Thubsuang, U.; Dubas, S. T.; Wongkasemjit, S.; Chaisuwan, T. Enhanced CO2 capturing over ultra-microporous carbon with nitrogen-active species prepared using one-step carbonization of polybenzoxazine for a sustainable environment. Journal of Environmental Management, v. 223 (1), p. 779-786, 2018.

Wang, S.; Li, W.; Zhang, L.; Jin, Z.; Lu, A. Polybenzoxazine-based monodisperse carbon spheres with low-thermal shrinkage and their CO2 adsorption properties. Journal of Materials Chemistry A, 2, 2014, 4406.

* cited by examiner

PROCESS FOR PREPARING A POLYBENZOXAZINE-DERIVED CARBON MEMBRANE, CARBON MEMBRANE, USE OF SAID MEMBRANE FOR SEPARATING INDUSTRIAL GASES AND PERMEATION MODULE

FIELD OF THE DISCLOSURE

The present disclosure falls within the field of Engineering Materials, specifically in the field of polymeric and inorganic materials, and describes a process for curing the benzoxazine monomer followed by a protocol for pyrolysis of the polybenzoxazine polymer (PBZ). Furthermore, the present disclosure refers to a carbon membrane derived from the PBZ polymer, which has as a feature of an improved separation of gases with different kinetic diameters through the mechanism of molecular sieving.

BACKGROUND OF THE DISCLOSURE

Separation of gases such as oxygen or nitrogen from air, adjustment of the synthesis gas ratio, purification of natural gas, separation of olefins and paraffins, recovery of purge streams, separation of reaction by-products, are some examples of important applications on an industrial scale. Gas separation technology using membranes is a more efficient and economical strategy compared to conventional operations used such as distillation, absorption, and adsorption. Separation with no phase change and the absence of the need to use chemical reagents makes these processes a very competitive alternative to conventional separation processes. Membrane separation processes are already available for these industrial gas separations; however, the available membranes are polymeric and present high swelling during the process, the so-called plasticization, which significantly reduces the separation efficiency and the shelf-life of the membrane. Furthermore, they present further disadvantages such as operational temperature and pressure limitations and physical and chemical properties of the polymers that compose them that are not suitable for industrial processes.

In this context, the development of materials having greater resistance to the conditions required in the industrial context is widely investigated. Inorganic carbon membranes (CM) are a promising alternative to polymeric membranes in the separation of industrial gases. MCs are obtained from the pyrolysis process of precursor polymer membranes, under an inert atmosphere or vacuum. This process consists of the controlled thermal decomposition of the precursor polymer and promotes the formation of a membrane having a final carbon structure. The CM structure is characterized by regions containing amorphous carbon and small crystalline sites similar to graphene, which form a porous structure designated as turbostratic. CMs have a bimodal pore size distribution composed of ultra micropores (<7 Å) and micropores (7 to 20 Å). As the main gas transport mechanism of these membranes is that of a molecular sieve, gases with very similar sizes (kinetic diameters) are separated with high efficiency. CMs is used in various industrial applications, namely: separation of streams of mixtures of paraffin and light olefins (ethane/ethene; propane/propene), in admixtures containing molecules such as $CO_2$, $N_2$ and CO, $O_2/N_2$ separation from air to obtain purified $N_2$ or streams having higher oxygen concentrations in the purification of natural gas, which aims to separate $CO_2/CH_4$. Gas molecules of smaller kinetic diameter tend to pass through the structure more easily, since their size is smaller than the average diameter of the membrane pores. Larger gas molecules are retained by the structure, due to the larger kinetic diameter.

CM performance in gas separation, as well as its porosity and mechanical, chemical, and thermal strength depends mainly on the intrinsic characteristics of the precursor polymer. In the literature, materials such as polyimide, phenolic resin, cellulose, poly (ether imide), as well as polymer blends, are commonly used as precursor polymers, as they have a high aromatic carbon content, high glass transition temperature and chemical and mechanical strength (LI, H. and LIU, Y. 2022). Concentration, free volume, crosslinking density, thermal and mechanical stability of precursor polymers are some of the parameters that directly affect the microstructure, thickness, and thermal and mechanical properties of CM, hence affecting the gas transport properties.

Polybenzoxazines (PBZ) are high-performance, cross-linkable polymers developed for advanced applications, such as in the aerospace and naval industries. The high thermal resistance (high percentage of residual carbon) and mechanics of PBZ have a positive impact on their application as precursor polymers for the manufacture of carbon membranes. Furthermore, PBZ present the possibility of flexibility in the molecular design and degree of curing, which allows their main polymeric chain to be altered in order to increase the interaction between the membrane and a certain gas of interest hence promoting greater selectivity in a mixture of gases. Currently there are no scientific articles and patents using PBZ polymer as a precursor material for the formation of CM. In the present disclosure, carbon molecular sieve membranes were prepared using PBZ as a precursor polymer, generating highly efficient membranes for the separation of gases of industrial interest.

STATE OF THE ART

The state of the art does not disclose any documents related to the manufacture and/or development of carbon molecular sieve membranes derived from polybenzoxazine. Patent documents containing information on polybenzoxazine or benzoxazine membranes are mainly related to the manufacture of electrolytic membranes for use as fuel cells, see, for example, US 2009/117440 A1, US 2009/117436 A1, US 2012/070765 A1, and US 2007/275285 A1.

Although no patent documents related to the development of polybenzoxazine-derived carbon membranes have been published, a document was found to suggest the application of polybenzoxazine as a polymeric material (polymeric membrane) for gas separation and other patents related to the development of polybenzoxazine-based microporous carbon material with application in gas separation and $CO_2$ capture. In this sense, the documents described below were found to deal with the issue.

Patent document U.S. Pat. No. 8,101,670 B2 discloses new polymers having benzoxazine groups in the main chain, which can be used as membranes for gas separation. The polymerization process of the benzoxazine monomer is an important and necessary step for cross-linking of the polymer chain to occur. Such polymerization can be carried out by adding a curing agent or by heat treatment, which promotes the opening of the oxazine ring and cross-linking of the structure. The aforementioned document does not suggest varying the curing protocol to modify the properties of the resulting material, nor does it suggest adjusting the pore size of the developed material by using different curing protocols. Therefore, the difference between the document and the present disclosure consists of the possibility of adjusting the performance of the carbon membrane with the curing protocol employed and producing an inorganic carbon membrane having a pore size distribution that allows the separation of gases by the molecular sieving mechanism. The document only suggests the possibility of applying polymers containing benzoxazine groups in gas separation, but provides no examples, descriptions and specifications about such a potential application. Furthermore, said document differs from the present disclosure in that it uses a polymeric membrane rather than a carbon one. Additionally, it should be noted that the aforementioned document does not present any examples that would demonstrate the separation of gases.

Patent document CN 109748279 A discloses a method of preparing and applying a microporous carbon material based on benzoxazine polymer. The aforementioned document suggests that a microporous material based on PBZ can be prepared by the synthesis of a phenol, an amine and a para-formaldehyde, followed by the following steps: liquid phase impregnation with an activator, lyophilization, chemical activation at temperatures between 50° and 900 °C, stripping and washing with water. The resulting carbon material had a pore diameter between 0.6 and 2 nm and a total pore volume of from 0.31 to 1.34 $cm^3/g$. Furthermore, the carbon material presented a carbon dioxide adsorption capacity at 0 °C and 1 bar of 4.02 to 7.06 mmol $g^{-1}$. Therefore, said document suggests its application in the adsorption of carbon dioxide in the field of gas separation and adsorption. However, this document differs from the present disclosure due to the process of obtaining the carbon structure and the application as a carbon membrane for the separation of different gases. Furthermore, well-defined curing protocols are used with a heating ramp composed of heating rates and isothermal plateaus.

It is noteworthy that the methodology for obtaining the PBZ of the present disclosure differs completely from that disclosed in the cited document. In the present disclosure, a commercial benzoxazine monomer is used, which is homogenized with a compatible solvent, such as methyl ethyl ketone, under heating of up to 120 °C. This benzoxazine monomer is spread on a silicone substrate or used as a coating on a porous support. Afterwards, the curing protocol is carried out followed by pyrolysis. The methodologies used in both studies differ from each other, as do the fields of application of the disclosures. In said document the goal is to prepare an adsorbent carbon material, while in the present disclosure the preparation of carbon membranes for gas separation/purification is proposed, i.e., they are completely different applications. The field of disclosure of said document focuses on $CO_2$ adsorption, therefore, no permeation tests were carried out to verify gas permeability through the materials. Furthermore, gases originating from ethane ODH and the separation of olefins and paraffins have not been investigated.

Patent document CN 114538438 A entitled "CARBON MOLECULAR SIEVE MATERIAL FOR REMOVING CARBONYL SULFIDE IN COAL GAS AS WELL AS PREPARATION METHOD AND APPLICATION OF CARBON MOLECULAR SIEVE MATERIAL" discloses a carbon molecular sieve material for removing carbonyl sulfide in coal gas, as well as a method of preparation and application thereof. In this regard, the carbon molecular sieve material is prepared by taking a polybenzoxazine-based resin material obtained by one-step polymerization and high temperature pyrolysis of phenol and aldehyde compounds as raw material, and then carrying out high temperature molding, drying and activation. The carbon molecular sieve material has the advantages of large specific surface area, concentrated micropore distribution, high mechanical strength, has a good adsorption effect on carbonyl sulfide in various industrial gases, and has good cyclic regeneration performance. The method of preparation of the carbon molecular sieve material has the advantages of being safe, using low-cost raw material, being free of by-products and the like, and having a potential industrial application value.

However, said document differs from the present patent by the method of cross-linking the polymer chain of the benzoxazine monomer. Polymerization of the benzoxazine-based material was carried out in one step in a hydrothermal reactor between 9 and 110 °C followed by the pyrolysis protocol between 80° and 1100 °C. Therefore, a thermal curing protocol in an air convection oven was not used, nor was the variation of the curing temperature on the final properties of PBZ evaluated. Furthermore, the molecular sieving material is prepared as an adsorbent material rather than a gas separation/purification carbon membrane. Characterizations show that the prepared material has a pore size distribution in the micropore range, which is different from the carbon membrane developed in the present disclosure, which has regions having sizes in the microporous and ultra micropore range, which are essential characteristics for a membrane be classified as a molecular sieve membrane.

Patent document BR 102018009075 entitled "PROCESS FOR OBTAINING ULTRA-THIN DENSE FILM, ULTRA-THIN DENSE POLYMER FILM COMPOSITION AND USE OF THE FILMS FOR GASE SEPARATION" describes a process for obtaining an ultra-thin dense film, an ultra-thin dense polymer film composition and use of films for gas separation. Said document describes a process for obtaining an ultra-thin dense polymeric film on porous supports. The process can be used to manufacture membranes for the separation/purification of liquid or gaseous components or aqueous solutions. More specifically, the document is based on the manufacturing process of an ultra-thin dense layer formed from the deposition of a polymeric solution on a porous support. Finally, the document makes it possible to reduce the manufacturing time of a supported membrane and allows obtaining a highly homogeneous and thin layer.

Preparation of polymeric or carbon membranes deposited on ceramic supports is widely disclosed by the scientific community, since depending on the precursor polymer used in the manufacture of the membrane, it may have low mechanical resistance, indicating the need for preparation on a porous support. The aforementioned document describes a method for covering ceramic supports with a polymeric solution, which can be one of the methods used in covering supports. The PBZ-derived membranes that are object of the present disclosure, whether polymeric or carbon, can also be prepared with no support, as they can cause the formation of self-supported carbon or polymeric films. Furthermore, the document does not suggest the use of PBZ as a polymeric material for preparing membranes, nor does it present the possibility of using curing protocols in the development of the material.

Patent document U.S. Pat. No. 8,608,828 (B2) entitled "PROCESS FOR PRODUCING CARBON MEMBRANES" refers to the use of organic polymer solutions for producing carbon membranes suitable for gas separation, and a process for producing carbon membranes suitable for gas separation, comprising the steps of a) coating a porous substrate with organic polymer solutions, b) drying the polyester coating on the porous substrate by removing the solvent, and c) pyrolysis of the polyester coating on the porous substrate to form the carbon membrane suitable for gas separation, it being possible to carry out any of steps a) to c) or the sequence of steps a) to c) more than once.

Said patent describes the process of preparing supported carbon membranes suitable for gas separation. Application of carbon membranes in gas separation is consolidated in the literature. The document in question presents the classic methodology for preparing carbon membranes, which consists of the steps of a) covering the porous support with an organic polymeric solution, b) drying characterized by the removal of solvent present in the precursor polymeric coating, and c) a pyrolysis process responsible for forming the carbon membrane. The patent makes no mention of polybenzoxazine in the list of possible polymers to be used as a precursor material for the carbon membrane. The referenced document anticipates the use of crosslinkable polymers, such as unsaturated polyester, which need to be cured prior to the pyrolysis process in order to avoid melting and rearrangement of the polymeric structure, promoting the formation of an energetically more stable carbon structure. In the patent examples, the polymer crosslinking process is described and consists only of heat treatment at a defined temperature for a predetermined time. Unlike the present disclosure, a curing protocol characterized by heating ramps and plateaus was not used or cited. Performance tests were carried out using a gas mixture composed of hydrogen and propane. As a result of the permeation tests, the prepared carbon membranes showed efficient selectivities for the evaluated separation. The present disclosure did not evaluate the separation of gases from the ODH process from ethane, nor does it mention the possibility of applying these membranes in the separation of ethane and ethylene.

It should be noted that the process of cross-linking the polymer chain, whether by curing agent or heat treatment, is not exclusive to polybenzoxazines. Therefore, other polymers can also be previously crosslinked. However, this step is important to transform the polymer into a thermosetting material. The document in question, despite mentioning the crosslinking step, does not link it to pore size adjustment, nor does it investigate the variation in the curing protocol, nor does it mention PBZ as a precursor polymer for the preparation of carbon membranes.

The scientific literature also presents no studies on the manufacture/development of carbon molecular sieve membranes derived from polybenzoxazines, only some teachings related to the development of PBZ polymeric membranes and carbon adsorbents derived from PBZ with application in gas separation. The articles found in the literature are described below.

The report entitled "POLYBENZOXAZINE-BASED MONODISPERSE CARBON SPHERES WITH LOW-THERMAL SHRINKAGE AND THEIR $CO_2$ ADSORPTION PROPERTIES" describes carbon spheres based on polybenzoxazines. The porous carbon material was prepared from the carbonization of PBZ at final temperatures of 500, 600, 700 and 800 °C. Results indicated that porosity of carbon materials is related to the carbonization temperature and, accordingly, this variation in the material porosity affects the adsorption of $CO_2$. The higher the carbonization temperature, the greater the porosity and the greater the $CO_2$ adsorption capacity. Furthermore, the carbon materials presented a nitrogen content on their surfaces, suggesting that the adsorption of $CO_2$ also occurs through the interaction of the nitrogen present in the chemical structure of the carbon material with the gas molecules of interest.

The report entitled "ENHANCED $CO_2$ CAPTURING OVER ULTRA-MICROPOROUS CARBON WITH NITROGEN-ACTIVE SPECIES PREPARED USING ONE-STEP CARBONIZATION OF POLYBENZOXAZINE FOR A SUSTAINABLE ENVIRONMENT" has also investigated enhanced $CO_2$ capture using ultra microporous carbon materials from PBZ. The carbon materials were obtained from the PBZ carbonization process at temperatures of 600 and 800 °C, under a nitrogen atmosphere. Furthermore, with the aim of increasing the micropore volume in the material structure, an activation heat treatment at 900 °C under an oxidizing atmosphere ($CO_2$) was performed. From the analysis of the chemical structure of the carbon material, it was observed that the nitrogen content decreased with increasing final carbonization temperatures and that different types of nitrogen were formed at each temperature assessed. In the adsorption tests carried out at 30 and 50 °C and at pressures between 3 and 7 bar, $CO_2$ adsorption increased with the increase in carbonization temperature, and the carbon material subjected to the activation process showed $CO_2$ adsorption superior to the carbonized material without this step. These results are related to nitrogen forms (N-pyridine and N-pyridone) generated during the activation step that can act as active sites for $CO_2$ capture and can increase the adsorption capacity of gas molecules. Furthermore, there was an increase in the specific surface area and the volume of micropores of carbon materials, indicating that the adsorption performance also takes place through physical adsorption rather than chemisorption alone. Therefore, the results suggest that the $CO_2$ adsorption capacity took place from the combination of specific surface area, microporosity and types of nitrogen functionality.

Other papers have also investigated the use of PBZ-based carbon porous materials for application as $CO_2$ adsorbents. The report entitled "STRUCTURALLY DESIGNED SYNTHESIS OF MECHANICALLY STABLE POLY (BENZOXAZINE-CO-RESOL)-BASED POROUS CARBON MONOLITHS AND THEIR APPLICATION AS HIGH-PERFORMANCE $CO_2$ CAPTURE SORBENTS" obtained porous carbon materials with $CO_2$ adsorption capacity in the range of from 3.3 to 4.9 mmol $g^{-1}$ at 0 °C and from 2.6 to 3.3 mmol $g^{-1}$ at 25 °C. Furthermore, selectivities to the $CO_2/N_2$ gas pair were evaluated, which ranged between 13 and 28.

PBZ polymeric membranes were developed aiming at the separation of $CO_2$, $N_2$, $O_2$ and $CH_4$ based on studies disclosed in the report entitled "SYNTHESIS AND CROSS-LINKING OF POLYETHER-BASED MAIN CHAIN BENZOXAZINE POLYMERS AND THEIR GAS SEPARATION PERFORMANCE". Polymeric cross-linked films were prepared from the synthesis of bisphenol A and aliphatic poly(ether diamine) in the presence of paraformaldehyde. The curing process (crosslinking) was carried out in a convection oven at 200 °C for 5 h, with the temperature gradually increased from 120 °C to 200 °C at intervals of 20 °C, with isothermal levels of 2H. As a result of the pure gas permeation test at 30 °C, the gas permeability order was $CO_2>O_2>CH_4>N_2$ indicating that the gas transportation mechanism in these polymeric membranes is sorption-diffusion. Furthermore, one of the PBZ polymeric membranes (Poly (BZ-JED900)) presented permeabilities of 21, 8, 345 and 22 Barrer for gases $O_2$, $N_2$, $CO_2$ and $CH_4$, respectively, and selectivities of 2.7, 43.5 and 15.7 for $O_2/N_2$, $CO_2/N_2$ e $CO_2/CH_4$, respectively.

Based on the studies of the aforementioned prior art (including scientific reports and patent documents), no documents were found to anticipate or suggest the development of an inorganic carbon membrane derived from PBZ. The mentioned documents only suggest the preparation of PBZ-based carbon porous materials for the capture of $CO_2$ and PBZ polymeric membranes that do not act through the molecular sieving transport mechanism.

In view of the above, the present disclosure is intended to solve the problems of the prior art of carbon membranes such as the formation of membranes with the improved combination of selectivity and permeability for different gas pairs, namely, $CO_2/N_2$, $CO_2/CH_4$, $CO_2/C_2H_4$, $CO_2/C_2H_6$, $O_2/N_2$, $C_2H_4/C_2H_6$ and $C_3H_6/C_3H_8$.

Furthermore, some of the prior art documents describe other developments of carbon membranes, such as:

The report entitled "POLYBENZOXAZINES IN FABRICATION OF SEPARATION MEMBRANES: A REVIEW" describes that the low thermal resistance of membrane materials restricts the application of polymeric membranes in many industrial separation processes, such as gas separation. Furthermore, the aforementioned document points out that polybenzoxazines (PBzs) can be promising alternatives for manufacturing high-performance membranes due to the excellent temperature, chemical and physical stability of the resulting membranes. Properties of PBz systems can be easily modified by altering monomers and synthesizing main-, side-, and end-chain PBz precursors. In this review, the properties and synthesis methods of PBz are presented and different types of PBz-based membranes are reviewed in processes such as gas separation. Most PBz-based membranes are used in strong, stringent, high-temperature acidic conditions or solvent filtration successfully, approving the high performance of these membrane materials. Furthermore, the structure to properties relationship of PBZ membranes is researched.

However, said document consists of a review article that addresses the general properties of polybenzoxazines and their applications in the field of membranes. In the field of gas separation, the article presents scientific work using polybenzoxazine synthesized as a polymeric membrane or porous carbon beads for the capture/adsorption of $CO_2$. None of the studies referenced to in this article use commercial polybenzoxazine. Polybenzoxazine is a high-performance polymer that is polymerized from the crosslinking process initiated by adding addition a curing agent or through crosslinking heat treatment. Unlike the present disclosure, the document does not investigate the influence of temperature of the thermal curing process of the prepolymer (benzoxazine monomer) on the final properties of the material. For benzoxazine polymerization, the studies used only a heating protocol. In studies referring to the production of porous carbonaceous material, the parameter evaluated was the pyrolysis/carbonization temperature, such variable being commonly studied in the literature related to the development of carbon membranes, regardless of the precursor polymer used. Regarding gas transport tests, researchers have assessed the $CO_2$ adsorption capacity, therefore gas permeation tests on materials with flat, tubular, or hollow fiber configurations were not carried out and permeability/permeance results were not obtained. Furthermore, the mechanisms responsible for capturing gaseous $CO_2$ molecules were identified as chemisorption and physisorption, while in the present disclosure the main gas transport mechanism was found to consist of molecular sieving. Regarding the development of polymeric PBZ membranes, as informed by the aforementioned document, polyethylene glycol was added to the PBZ structure in order to improve gas permeability, again no variation of the curing protocol was carried out, nor was the influence of this parameter on the properties of the resulting material verified. In the disclosed study (reference 130 of said document) the transport mechanism of $H_2$, $CO_2$, $O_2$, $CH_4$ and $N_2$ gases through the membrane, which was classified as sorption-diffusion governed by the critical temperature of the gases. Based on this review article, no data was found to indicate the use of PBZ as a precursor polymer for the development of carbon membranes, nor that the predominant mechanism in these filter materials is molecular sieving. Furthermore, transport of He, $C_2H_4$ and $C_2H_6$ gases was not assessed.

The report entitled "SYNTHESIS AND CROSSLINKING OF POLYETHER-BASED MAIN CHAIN BENZOXAZINE POLYMERS AND THEIR GAS SEPARATION PERFORMANCE" describes that benzoxazine polymers based on poly (ethylene glycol) were synthesized and that the polymeric solutions were melted on a glass plate and cross-linked through heat treatment to produce strong and flexible films without the use of external additives. The transport properties of single gas ($H_2$, $O_2$, $N_2$, $CO_2$ e $CH_4$) of cross-linked polymeric membranes were measured. PEG-based polybenzoxazine crosslinked membranes show improved selectivities for $CO_2/N_2$ and $CO_2/CH_4$ gas pairs. The good separation selectivities of these PEG-based polybenzoxazine materials suggest their usefulness as efficient thin-film composite membranes for gas-liquid membrane separation technology.

However, said document investigates the performance of flexible polymeric membranes made of PBZ synthesized in the presence of poly (ethylene glycol) (PEG) against the transport of gases ($H_2$, $O_2$, $N_2$, $CO_2$ and $CH_4$). PBZ membranes showed improved selectivity towards $CO_2/N_2$ and $CO_2/CH_4$ gas pairs. The PBZ polymeric membranes synthesized with PEG were polymerized through conventional thermal curing treatment, using only a defined protocol. As a result of the pure gas permeation test at 30 °C, the order of gas permeability was $CO_2$>$O_2$>$CH_4$>$N_2$, indicating that the gas transportation mechanism in these polymeric membranes is sorption-diffusion. The study differs from the present disclosure because the membranes developed are polymeric and prepared on a glass substrate, which is subsequently separated from the membrane. Furthermore, the study does not suggest the predominance of the molecular sieving mechanism, nor does it show the possibility of separating olefins/paraffins and application in the process of oxidative dehydrogenation of ethane (ODH).

The report entitled "HYDROTHERMAL STABILITY OF HYDROGEN-SELECTIVE CARBON-CERAMIC MEMBRANES DERIVED FROM POLYBENZOXAZINE-MODIFIED SILICA-ZIRCONIA" discloses the long-term hydrothermal performance of composite carbon-$SiO_2$—$ZrO_2$ membranes. A carbon —$SiO_2$—$ZrO_2$ composite was formed from the inert pyrolysis of $SiO_2$—$ZrO_2$-polybenzoxazine resin. A carbon-$SiO_2$—$ZrO_2$ membrane manufactured at 750 °C has exhibited $H_2$ selectivity on $CO_2$, $N_2$ and $CH_4$ of 27, 139, and 1026, respectively, which were higher than those of a membrane manufactured at 550 °C. (5, 12, and 11, respectively). In addition to maintaining high $H_2$ permeability and selectivity, the carbon-$SiO_2$—$ZrO_2$ membrane manufactured at 750 °C also showed better stability under hydrothermal conditions at partial vapor pressures of 90 (30 mol %) and 150 kPa (50 mol %) compared to the membrane manufactured at 500 °C. This was attributed to the complete pyrolytic and ceramic transformation of the microstructure after pyrolysis at 750 °C. This work therefore demonstrates the promise of membranes for separation of $H_2$ under stringent hydrothermal conditions.

The aforementioned document proposes the development of PBZ-modified $SiO_2$ and $ZrO_2$ membranes. The molecular sieving mechanism was identified only at the pyrolysis temperature of 750 °C, related to the narrowing of the pores at this temperature. At the pyrolysis temperature of 550 °C, the predominant mechanism is Knudsen diffusion. This difference in gas transportation is attributed to the higher pyrolysis temperature, which allows the complete pyrolytic transformation of the structure, generating a narrowing of the pore structure and the formation of dense regions. Furthermore, this result was found for a membrane composed of $SiO_2$, $ZrO_2$ and a small percentage of PBZ (0.25%, by mass, of the polymeric solution). Performance tests regarding gas separation have not been performed for carbon membranes derived from pure PBZ. Therefore, predominance of the molecular sieving transportation mechanism is related to the inorganic composite material ($SiO_2$, $ZrO_2$ and 0.25%, w/w, carbon derived from PBZ) and not to the PBZ polymer. Also, there are no findings on the possibility of applying these membranes to separate ODH by-products from ethane and olefins/paraffins.

In this context, the process of developing PBZ carbon membranes, as disclosed in the present disclosure, occurs from the possibility of controlling physical-chemical properties and gas transport by adjusting the thermal curing protocol of the monomer that originates the precursor polymer. Benzoxazines consist of a PBZ monomer and are chemically made of oxazine rings (six-membered heterocyclic ring with one oxygen atom and one nitrogen atom) linked to benzene aromatic rings. An important characteristic of benzoxazines is the ease and versatility of the synthesis that takes place through a condensation reaction of three compounds: phenol, amine, and formaldehyde, which give rise to a benzoxazine monomer. Regardless of the monomer used, for benzoxazine polymerization to occur, it is necessary to carry out a curing process that promotes the initiation of crosslinks in the thermosetting polymer through the oxazine ring opening mechanism. The curing process of the benzoxazine monomer can occur through thermal or chemical treatment with a suitable catalyst/curing agent or by ultraviolet radiation. Determination of a well-defined curing protocol is essential to specify the material characteristics, as a low degree of crosslinking (inadequate curing cycle) can affect the chemical structure of the polymer and, accordingly, its properties. Typically, researchers employ a single method of curing benzoxazine monomer, with heat treatment being the most common. In the present disclosure, the surprising combination of chemical curing agent with the thermal curing protocol was used for the first time in the crosslinking of benzoxazine. This combination was used to increase the crosslinking density of the polymer chain.

Polybenzoxazines (PBZ) are high-performance, crosslinkable polymers developed for advanced applications, such as in the aerospace and naval industries. The high thermal resistance (high percentage of residual carbon) and mechanics of PBZ have a positive impact on their application as precursor polymers for the manufacture of carbon membranes. Furthermore, PBZ present the possibility of flexibility in the molecular design and degree of curing, which allows their main polymeric chain to be altered in order to increase the interaction between the membrane and a certain gas of interest hence promoting greater selectivity in a mixture of gases.

In the present disclosure, a new PBZ-derived carbon membrane was developed from different thermal curing protocols for the separation of industrial gases. The state of the art fails to disclose the manufacture and/or development of carbon molecular sieve membranes derived this polymer. No processes are disclosed or taught relating to the control of gas transport properties of PBZ-derived materials by adjusting the final temperature of the benzoxazine monomer curing protocol.

Accordingly, inventiveness of the present disclosure is linked to the adjustment of parameters of the benzoxazine monomer curing protocol (process/method) that directly promotes the adjustment of the final properties of the carbon membrane. Although the documents mentioned in the prior art indicate that there is relevant information on the characteristics of the present disclosure, they do not suggest that changing the curing protocol of the benzoxazine monomer can directly influence gas transport properties. To date, the state of the art only uses a curing protocol that can be commonly determined from characterizations of the thermal properties of PBZ (differential scanning calorimetry and/or thermogravimetric analysis). The studies seek to use/define only an appropriate curing protocol that does not harm the properties of benzoxazines and promotes the formation of an intact structure. There are no studies that evaluate the possibility of adjusting the parameters of the benzoxazine monomer curing protocols and relate them to the gas transport properties of PBZ.

Therefore, the present disclosure describes the preparation of a carbon membrane from polybenzoxazine (PBZ), and the adjustment of pores based on the curing protocol of the precursor polymer, which affects the membrane performance. Although the curing step is an essential process for the formation (crosslinking) of the PBZ polymer, its influence on the pore adjustment of carbonaceous materials is not reported in the literature and is not an obvious parameter to be modified in the formation of carbon membranes (CM). Previous studies mention that the PBZ properties can be modified through the curing process, but this information is only validated for polymeric materials. There are no documents suggesting the optimization of performance of a PBZ-derived carbonaceous material from the curing process. A person skilled in the art would not think of combining the teachings of the prior-art documents, since after the thermal curing process PBZ is subjected to the pyrolysis protocol, which consists of a heat treatment distinct from the curing process. Therefore, a person skilled in the art of carbon membranes can understand that variation in the final curing temperature of PBZ would be trivial, since the precursor polymer would be thereafter subjected to a new heating protocol during the pyrolysis process. This process is carried out at high temperatures (greater than 500 °C) which could have an effect that overlaps with the curing effect. Furthermore, a person skilled in the art of carbon membranes would usually perform the pore adjustment based on the pyrolysis protocol, as consolidated in different experimental studies of carbon membranes. There are no documents suggesting that the PBZ curing protocol can be a significant experimental parameter for pore tuning and consequently can optimize carbon membrane performance. To date, the prior-art documents only use an optimal curing protocol for crosslinking the PBZ monomer, which can be commonly determined from characterizations of the thermal properties of benzoxazine (differential scanning calorimetry and/or thermogravimetric analysis).

Variation in the curing protocol of the PBZ precursor polymer may contribute to the use of milder temperatures in the pyrolysis protocol. This is because carbon membranes having different pore sizes are obtained with the same pyrolysis protocol, so in a single pyrolysis protocol it is possible to obtain different membranes with different performances. Furthermore, from a single precursor material and a single methodology it is possible to obtain different membranes suitable for separating different pairs of gases since all membranes are prepared from the same polymeric solution and are subjected to the same oven, where cure takes place. The difference in the process of preparing these membranes consists of removing them from the oven, each membrane is removed at a different curing temperature, for example, membranes can be removed at 80 °C, 150 °C and 200 °C, interrupting the curing process at that temperature. Afterwards, the membranes are subjected to the pyrolysis oven and undergo the same heating protocol in order to form carbon membranes. Therefore, from a single preparation method it is possible to obtain membranes having different characteristics, a person skilled in the art would not be able to think of this without carrying out experimental tests. Typically, the studies evaluate experimental parameters in the preparation of a material in order to determine the optimal parameter to obtain a material having the desired property.

Another embodiment of the present disclosure consists of combining a commercial chemical curing agent (Aradur HZ 8293 N 68 Cl, Huntsman) with the thermal curing protocol. A person skilled in the art would not think of combining the two forms of curing in a single process, since the use of a single agent is already effective for crosslinking the precursor polymer. There are few studies that use only the chemical curing agent in the crosslinking of PBZ, since catalysts are usually used in the preparation of benzoxazine prior to the thermal curing process in order to reduce the optimum curing temperature of the polymer. One of the main disadvantages of PBZ is the high curing temperature (greater than 200 °C.). Thus, according to the present disclosure, addition of such a commercial curing agent allows thermal cross-linking to be carried out at mild temperatures (below 200 °C.). In the present disclosure, the commercial curing agent was added to benzoxazine and promoted an increased carbon content after the pyrolysis process. Furthermore, this agent contributes to prevent the precursor solution from penetrating the pores of the porous support (avoiding intrusion of the solution on the support).

Furthermore, the use of PBZ as a precursor polymer for carbon membranes can be considered a novelty, as there are no previous studies that fully describe this application. A challenge in the field of supported carbon membranes is the efficiency of selective carbon layer formation on the porous support. Although different polymers are "theoretically" classified as potential precursor polymers for carbon membranes, in practice not all of them are suitable for this application, as some of them are not capable of adhering to the porous support, forming an integral selective layer with a bimodal pore size distribution (presence of ultra micropores and micropores in the selective carbon layer). In the present disclosure, it was verified for the first time the possibility of forming a selective carbon layer derived from integral PBZ on a porous alumina support and having adequate thickness for gas separation, according to the scanning electron microscopy (SEM) imaging made available in FIG. 1.

As previously mentioned, a technician in the field would not think of adjusting the thermal curing protocol, as the membrane will subsequently be subjected to the pyrolysis protocol, in which the temperatures of this process overlap with the temperature used in the curing stage. The curing and pyrolysis protocols consist of heating protocols, with the curing protocol usually carried out in an air atmosphere with the aim of crosslinking the polymer chain, while the pyrolysis protocol is carried out in an inert atmosphere or in a vacuum aiming at controlled decomposition of the polymer chain, which generates the carbon membrane. Thus, the person skilled in the art might think that carrying out the curing process would be an unnecessary energy expenditure, since the polymer would subsequently be subjected to heat treatment again.

The person skilled in the art would not rule out the curing treatment, as this is an essential step in the cross-linking of PBZ. Formation of the PBZ polymer only occurs during thermal curing treatment or from the addition of a chemical curing agent. The person skilled in the art would probably define the optimal curing temperature based on thermogravimetric analyzes or differential scanning calorimetry and would then subject the membrane to pyrolysis processes under different temperature conditions so as to adjust the material's pores. As previously mentioned, the present disclosure presents the possibility of adjusting the pore structure of PBZ membranes by varying the temperature of the curing step, the pyrolysis temperature being kept constant for samples cured at different temperatures.

The present disclosure discloses the preparation of a carbon membrane from polybenzoxazine and the possibility of adjusting the pores of the carbon membrane using the PBZ precursor polymer curing protocol.

In the state of the art, the documents report the manufacture of polymeric PBZ membranes, wherein the predominant gas separation mechanism consists of sorption-diffusion, differing from the carbon membranes of the present disclosure which have gas transport properties governed mainly by molecular sieving mechanism. The molecular sieving mechanism was found in some of the aforementioned documents. Document "Hydrothermal Stability of Hydrogen-Selective Carbon-Ceramic Membranes Derived from Polybenzoxazine-Modified Silica-Zirconia" uses PBZ as a chelating binder in an inorganic silica-zirconia membrane. Diverging from the present disclosure, the composite inorganic membrane was cured at two different curing temperatures (90 and 200 °C) so as to facilitate the cross-linking of PBZ with the vinyl group of vinyltrimethoxysilane. The authors have found that curing up to 90 °C is not efficient for crosslinking PBZ. Furthermore, adjustments to the pores of the composite membrane are made using different pyrolysis protocols, diverging again from the present disclosure which performs such an adjustment during the curing protocol. The curing mechanism of the composite membrane was verified only at the highest pyrolysis temperature (750 °C), at a lower temperature (550 °C) the predominant gas transport mechanism consists of Knudsen diffusion. In such a composite membrane, PBZ was used as a filler (low percentage of PBZ compared to other components such as silica and zirconia), therefore the gas transport mechanism cannot be related solely to the presence of PBZ, since no experiments were carried out without it. As for document CN 114538438 A, the molecular sieving mechanism was verified on PBZ-derived carbon particulate materials, self-supported or supported carbon membranes were not prepared in the cited document. Furthermore, a thermal curing protocol in an air convection oven was not used, nor was the variation in curing temperature on the final properties of PBZ assessed.

The prior-art documents did not make any changes in the curing protocol for benzoxazine, all documents prepare the polymeric material using a curing protocol suitable for forming the polymer. A person skilled in the art could not evaluate the variation of different curing protocols prior to the pyrolysis process of PBZ-derived membranes, as they would already be subjected to a heating protocol during pyrolysis. The curing step is an essential process for the crosslinking of benzoxazine, since prior to this step, the polymer is not formed and the material, which consists of a pre-polymer or monomer, is highly brittle. Only after the curing process the PBZ does crosslink and form a thermosetting polymer.

None of the prior-art documents are intended to apply PBZ-derived materials for the separation of olefins and light paraffins, such as ethylene and ethane. These gases have very close kinetic diameters (difference of approximately 0.2 Å), making their separation difficult. In the present disclosure, performance tests were carried out on membranes developed with pure gases (ethylene and ethane) and mixtures thereof in different compositions. Permeation and selectivity results have shown that carbon membranes derived from PBZ have potential application in the separation of olefins and light paraffins.

The preparation of the carbon membrane derived from PBZ consists of a complex methodology. Different experimental adjustments were required for a carbon membrane suitable for use in gas separation be obtained.

The first point to be considered is determining the ideal temperature for preparing the polymeric solution and the need to maintain the polymeric solution at that temperature during the film manufacturing process or when coating porous supports. Commercial benzoxazine, which is used in the present disclosure, drastically increases viscosity at room temperature. This fact makes the processability of the precursor polymer difficult, so handling the polymer solution at temperatures below 70 °C makes the uniform formation of PBZ-derived membranes impossible. It should be noted that in the present disclosure commercial PBZ (Huntsman) was used, unlike the works cited in the literature. The PBZ membranes in the literature are usually synthesized in the laboratory from different reagents. Therefore, materials having different characteristics and behaviors are obtained. Because of this, PBZs can differ structurally from each other.

Experimental adjustments to the PBZ precursor polymeric solution were necessary for the achievement of well-adhered, even, and shiny polymeric coatings on the support surface (FIG. 2.A and FIG. 2.C). In the beginning of the experimental activities, heterogeneous coatings were obtained on the supports, such as coatings with no adhesion of the precursor polymeric solution on the support surface (FIG. 2.B) and the polymeric solution entered the pores of the support (FIG. 2.D).

The polymer solution concentration also directly influenced the result of the formation of carbon membranes. Different solutions of precursor polymer were assessed until finding the optimal concentration that resulted in homogeneous and defect-free selective layers (FIGS. 3.A and 3.C). Carbon membranes prepared from high concentrations of precursor polymer (greater than 35%) caused the detachment of the selective carbon layer derived from PBZ from the support surface (FIG. 3.B and 3.D). Formation of selective carbon layers with defects and/or matt are not suitable for application in gas separation.

Thus, the present disclosure is intended to solve several problems related to the performance of current carbon membranes by adjusting the benzoxazine monomer curing protocol. Membrane separation processes are already available for industrial gas separations; however, the available polymeric membranes present high swelling during the process, the so-called plasticization, which significantly reduces the separation efficiency available shelf-life of the membrane. Furthermore, they have other disadvantages such as operational temperature and pressure limitations and also chemical exposure limits, which depend on the nature of the polymer(s) used in their manufacture.

SUMMARY OF THE DISCLOSURE

The present disclosure is intended to propose a process for developing carbon membranes based on the crosslinking and pyrolysis processes of polybenzoxazine (PBZ).

Furthermore, the present disclosure proposes said membrane that presents high performance in gas separation and also improved thermal and chemical stability, as well as flat, tubular, or hollow-fiber modules, depending on the configuration of the membrane used for the permeation system.

Furthermore, the present disclosure further proposes the use of said membrane in important industrial gas separation processes such as the separation of by-products of ethane oxidative dehydrogenation (ODH) (separation of $CO_2$/$C_2H_4$, $CO_2$/$C_2H_6$ and $C_2H_4$/$C_2H_6$ gas pairs), natural gas purification ($CO_2$/$CH_4$), in obtaining nitrogen purified from air ($N_2$/$CO_2$) and the concentration of oxygen in the air ($O_2$/$N_2$).

BRIEF DESCRIPTION OF THE FIGURES

To provide a total and full visualization of the goal of the present disclosure, the figures are presented below, which are referred to herein, as follows.

DETAILED DESCRIPTION OF THE DISCLOSURE

Figure 1:
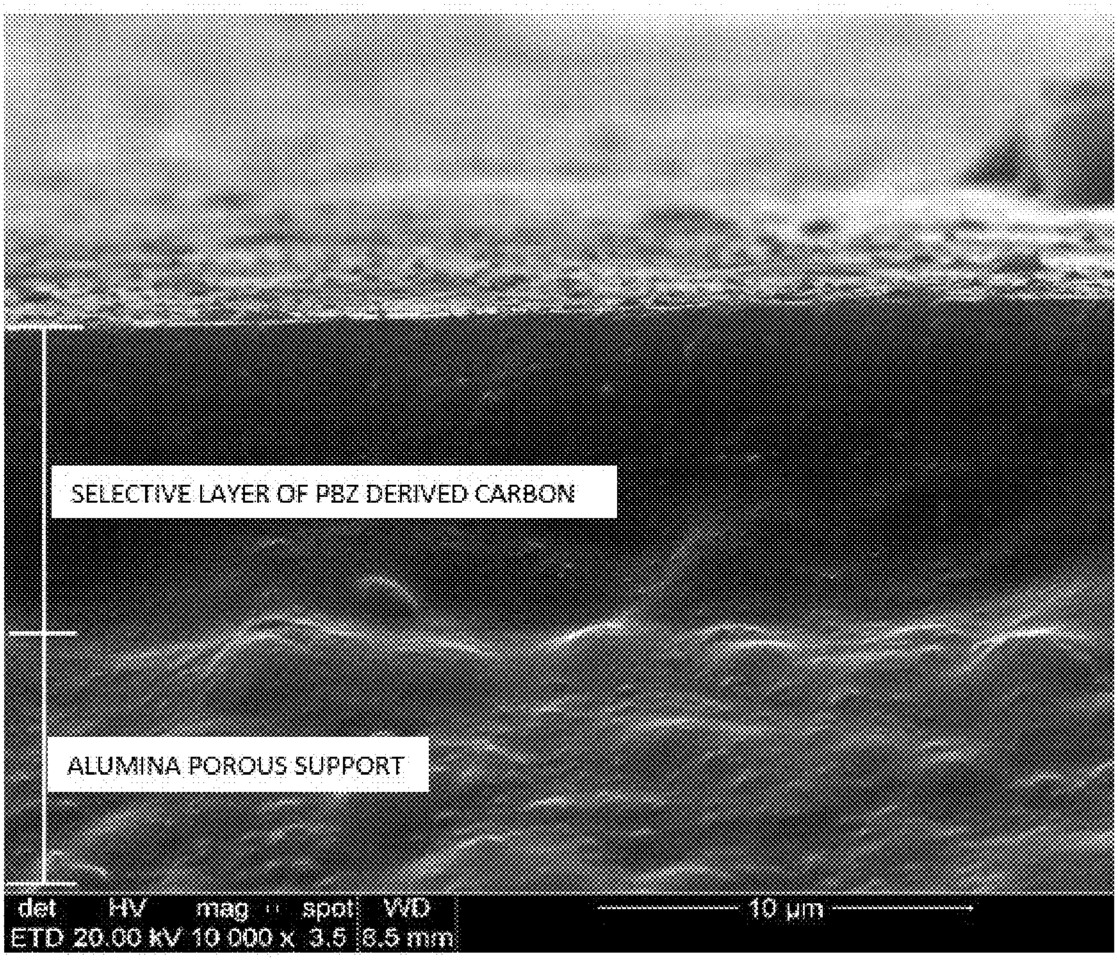
FIG. 1 illustrates an SEM image of the PBZ-derived carbon membrane supported at 10,000× magnification according to embodiments of the disclosure.
Figure 2:
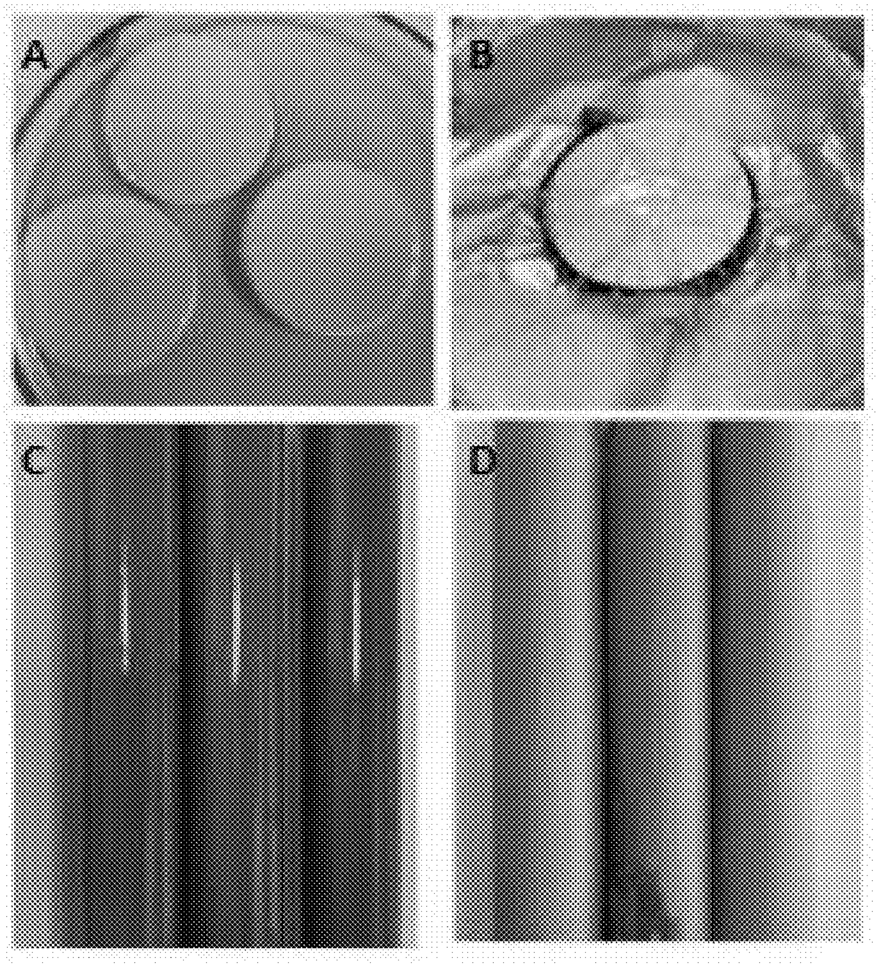
FIG. 2 illustrates in (Å) the flat supports uniformly covered with the PBZ polymeric solution—before the curing process; in (B) flat supports with non-adhered PBZ polymeric solution are illustrated; in (C) tubular supports efficiently covered with PBZ—after a curing process at a final temperature of 200 °C and in (D) the intrusion (matte coating) of polymeric solution in the tubular support is represented—after a curing process at a final temperature of 200 °C according to embodiments of the disclosure.
Figure 3:
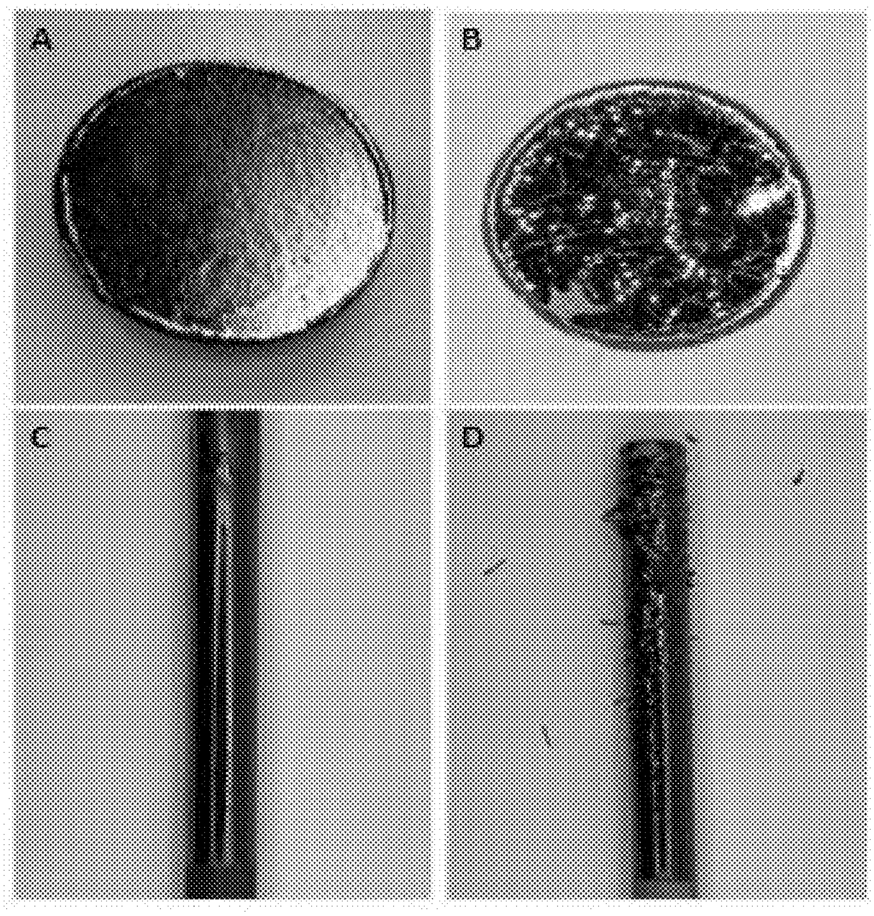
FIG. 3 illustrates in (Å) and (C) a selective homogeneous PBZ-derived carbon layer; in (B) and (D) a selective PBZ-derived carbon layer is illustrated with surface defects and detachment from the support according to embodiments of the disclosure.

The present disclosure relates, in a first embodiment, to a process for developing carbon membranes derived from PBZ. Said process comprises the following steps:

i. preparing the precursor polymer solution;
ii. coating a porous support with the precursor polymer solution or spreading the precursor polymer solution on a substrate for preparing self-supporting membranes;
iii. crosslinking process (benzoxazine monomer curing protocol);
iv. controlled thermal decomposition protocol (pyrolysis) of the crosslinked membrane;
v. membrane storage.

The present disclosure further describes analysis of performance through permeation tests of pure gases and mixtures through carbon membranes derived from PBZ.

To demonstrate the potential of said process, the present disclosure will be described in more detail in terms of the steps performed and their respective parameters.

The benzoxazine precursor polymer can be any polybenzoxazine, whether synthetic or derived from renewable sources. The polymeric benzoxazine (BZ) solution can be prepared, with or without heating, from dissolving the commercial prepolymer benzoxazine precursor in an organic solvent or from the synthesis of PBZ using a phenol, an amine, and an aldehyde. The organic solvent can be methyl ethyl ketone, chloroform, n-methyl-2-pyrrolidone, hexane, dimethylacetamide, dimethylformamide, toluene, not limited to these, or mixtures thereof, ensuring solubilization of the polymer.

Furthermore, in the synthesis of PBZ, a compound from a renewable source such as lignin, cardanol, resveratrol, eugenol, guaiacol, catechol and vanillin, not limited to these, or synthetic phenolic compounds such as bisphenol A, bisphenol f, resorcinol, can be used as phenol. Trihydric phenol, 2-aminophenol, among other phenolic compounds, but not limited to these, can be used as phenol. Furthermore, aniline, furfurylamine, ethylenediamine, curain, octafecylamine, triethylamine, methylenedianiline, among others, can be used as amines; and formaldehyde, paraformaldehyde, benzaldehyde, valeraldehyde, dimethylformaldehyde, not limited to these, can be used as aldehyde.

During the preparation of the polymeric solution, a curing agent can be added in order to increase the crosslinking density (degree of cure) of the PBZ polymer chain. The curing agent can be added at concentrations between 5 and 30% (w/w). To control viscosity of the benzoxazine polymer solution an organic solvent can be added. Concentration of the polymer solution is related to the thickness of the desired selective layer, so it can be used between 5 and 80% (w/w) of polymer. After preparing the polymeric solution, it can be subjected to an ultrasonic or vacuum bath, with or without heating, in order to eliminate bubbles formed in the previous steps.

The prepared polymeric solution, with or without curing agent, is used in the manufacture of self-supporting membranes prepared in flat configuration using a casting or electrospinning technique, and in the extrusion hollow fiber configuration, not limited to these manufacturing processes. Furthermore, the BZ polymeric solution can be used to coat a non-selective porous support. The support can be flat or tubular in shape and can be made of alumina, silicon carbide, metallic material, with or without the addition of additives, and non-woven fabrics. In the deposition of the polymeric solution on tubular supports, coating can be carried out on the internal or external surface of the tube.

The coating methodology on supports (flat or tubular) can be carried out by immersion (dip coating) or by rotation (spin coating).

Coatings with PBZ polymeric solutions can be carried out on the outside of ceramic tubes using the dip coating method. The ends of porous ceramic tubes are capped, and the tubes are slowly dipped into the polymeric solution for a predetermined time of between 30 and 600 seconds. Subsequently, the ceramic support is slowly removed from the solution so as to allow the excess to flow due to the action of gravitational force. The tubes covered with the polymeric layer can be subjected to new cycles, ranging between 0 and 5 additional cycles, following the same methodology. This process can be carried out at room temperature or at a controlled temperature. The membranes are dried at room temperature or in a temperature-controlled oven so that the solvent evaporates.

In the spin coating methodology, the polymeric solution is deposited on the surface of a support attached to a rod or base at a constant angular spinning speed that can range from 100 to 2000 rpm. The coating process can be carried out at room temperature or in a temperature-controlled oven. The membranes are a room temperature or in a temperature-controlled oven so that the solvent evaporates.

After the supported or self-supported membrane manufacturing process, BZ polymeric membranes are formed through the process of crosslinking the benzoxazine prepolymer, in which BZ rapidly polymerize through oxazine ring-opening polymerization. The crosslinking process can be thermal, chemical or by ultraviolet radiation, with or without additional catalysts or additives, such as polyaniline, 2,4-Di-tert-butylphenol, metal diethyl dithiocarbamates, tetramethylthiuram disulfide, zinc stearate, sulfur, thiols, ammonium salt, metal complexes of acetylacetonates, cyanuric chloride, Lewis acids, imidazoles, alkylenic acids, cyanate esters, p-toluenesulfonic acid, 2-ethyl-4-methylimidazole, adipic acid, strong bases such as sodium hydroxide or potassium hydroxide, among other catalysts and additives, but not limited to them. BZ prepolymers (monomers) exhibit thermoplastic behavior, becoming thermorigid after the curing process, so the curing process promotes the thermal adjustment of the final properties of PBZ polymeric membranes.

Prior to the curing process, the benzoxazine membrane has a benzene ring linked to an oxazine ring, characterized by a six-membered heterocyclic composed of oxygen and nitrogen atoms, according to the structure:

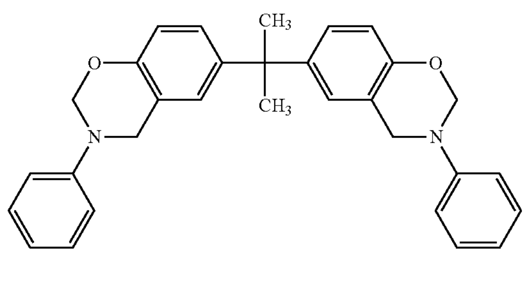 [SMILES: CC(C)(c1ccc2c(c1)CN(c1ccccc1)CO2)c1ccc2c(c1)CN(c1ccccc1)CO2]

During the BZ curing process, the cationic reaction of oxazine ring opening takes place, causing chain polymerization and forming crosslinked structures such as the following:

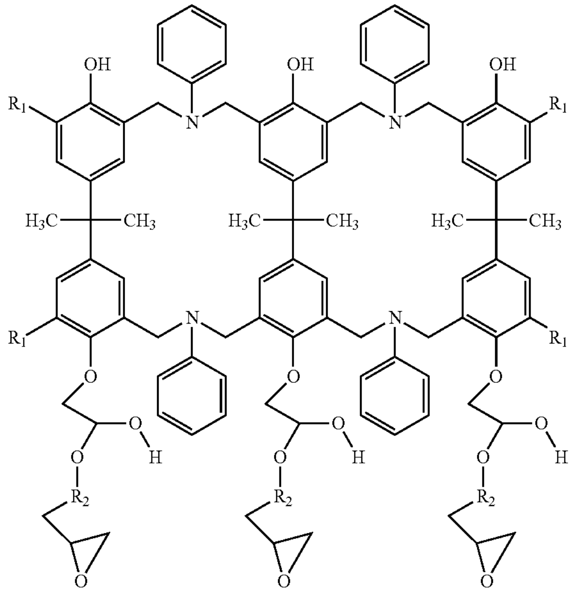

The number of crosslinked structures is generally related to the curing protocol. Depending on the temperatures and isotherms employed in the curing process, different amounts of closed oxazine ring and open benzoxazine ring structures are formed. The greater the degree of curing, the greater the percentage of polybenzoxazine structures characterized by the open ring structure.

By changing the curing protocol variables, such as time at temperature levels, final temperature, and heating rate, it is possible to obtain polymeric membranes with different degrees of crosslinking and, consequently, different structures. In the thermal crosslinking process (thermal curing process), the BZ polymeric membrane is subjected to a well-defined thermal treatment, which can be carried out in a convection/air circulation or drying oven, in the range of from 80 and 350 °C, for a pre-established time of from 3 to 12 hours, using a gradual increase in temperature at intervals ranging from 10 to 50 °C, with isothermal plateaus of 15 to 120 min. With regard to the pressure of the curing process, the polymeric membrane can be crosslinked between 1 and 100 atm, preferably under atmospheric pressure.

Formation of a thin and homogeneous carbon-selective layer of PBZ occurs from pyrolysis (thermal degradation) of the self-supported or supported polymeric membrane. The pyrolysis process can be carried out under vacuum or in an inert atmosphere (nitrogen, argon, helium, or mixtures thereof), it is also possible to use an oxidizing atmosphere in the first stages of pyrolysis up to 400 °C. The prepared membrane is inserted inside a quartz reactor located inside a temperature-controlled oven. Before starting pyrolysis, a purge is carried out with the atmosphere used in the process.

The pyrolysis protocol can be carried out in two stages, the first one taking place on a heating ramp from 90 to 300 °C, with a constant heating rate value between 1 and 10 °C/min, upon reaching the final temperature of the first stage, this temperature condition can be maintained for a fixed period of up to 120 min. This step can also be carried out in an oxidizing atmosphere. In the second step, the system continues to heat at a constant heating rate between 1 and 10 °C/min, until the final pyrolysis temperature, which can be between 30° and 1000 °C is reached. The final temperature can be maintained for a fixed period of up to 120 min. Furthermore, it is possible to carry out a pore activation step in an oxidizing atmosphere between 60° and 1000 °C. At the end of the pyrolysis protocol, the controlled cooling process can be carried out, at a cooling rate of up to 10 °C/min, to room temperature, under the atmosphere used in the pyrolysis process. Cooling can also be carried out naturally, without controlling the cooling rate.

After the pyrolysis and cooling process, the PBZ carbon membranes can be stored, until use, in a desiccator with silica and in an ambient, oxidizing, vacuum or inert atmosphere. Furthermore, storage can be carried out in a humid or dry atmosphere.

Thus, the present disclosure describes, in a second embodiment, carbon membranes derived from PBZ obtained by said process. The main features of carbon membranes consist of:

a. porosity, bimodal pore size distribution composed of ultramicropores (<7 Å) and micropores (7 to 20 Å);
b. mechanical and thermal strength, allowing the membranes to be used under different pressure (up to 100 bar) and temperature (up to 500 °C) conditions;
c. chemical stability, resistance to a wide pH range (0 to 14) and in contact with solvents, acidic and basic media;
d. high selectivities for different gas pairs. Selectivities for $CO_2/N_2$ and $CO_2/CH_4$ gas pairs greater then 20, values higher than those described for commercial polymeric membranes.

The membranes are supported or self-supported and can have a flat, tubular, or hollow fiber configuration. The main benefits of the membranes are:

a. high selectivity to certain gas pairs, which provides an efficient separation of industrial gases, obtaining purified streams of the gases of interest;
b. greater control of gas permeability from the curing protocol;
c. thermal and chemical stability suitable for real industrial processes that operate under mild temperature and pressure conditions;
d. possibility of controlling the structure of the carbon membrane by adjusting parameters of its manufacturing process;
e. increased selectivity and permeability of the gases of interest due to the interaction of gas molecules with the functional groups remaining in the carbon membrane chemical structure;
f. greater applicability of the carbon membrane in gas separation systems.

In a third embodiment, the present disclosure discloses the use of said membrane in a gas separation process from a feed stream composed of different gas molecules, with similar kinetic diameters. The main action is through the molecular sieving mechanism and can purify/separate industrial gases that have different and/or similar kinetic diameters.

The mixed matrix carbon membrane can be used in industrial gas separation systems including $C_2H_4/C_2H_6$, $C_3H_6/C_3H_3$, $CO_2/CH_4$, $O_2/N_2$ to separate olefins from a gas stream containing $C_2H_6$, $C_3H_8$, $CO_2$, CO, $CH_4$, $N_2$, for example.

In a fourth embodiment, the present disclosure defines a module for said membrane. The module comprises an enclosure capable of withstanding the temperature and pressure of use in the gas separation process.

In this sense, a permeation system can be composed of flat, tubular, or hollow fiber modules, depending on the configuration of the membrane used. Inside the module, the feed stream is contacted with the self-supporting PBZ carbon layer or deposited on the support. The permeate stream results from gases that permeate the surface of the membrane. The module is composed of three main parts: the central body of the module, which contains the supported membrane and two pieces at opposite ends, equipped with openings for coupling the feed stream, concentrate stream, gas drag stream and permeate stream. The module body is machined from 310 stainless steel or similar material, capable of withstanding the temperature and pressure conditions required by the permeation process. Sealing the module and fixing the membrane is done by using o-rings and gaskets, which guarantee the tightness of the gases used.

The main features of these modules can be described as:

Regarding the presence of two inlet streams and two outlet streams: the feed stream, which contains the gases to be separated, the permeate stream, which contains the mixture of gases that permeate the membrane, the concentrate stream, which contains the gases retained by the membrane and a drag stream, which aims to carry the permeate gases to a later stage of the process.

Regarding the tightness of the module, it must promote the containment of gases used, as well as avoid the mixing of the feed and permeate streams.

As for the geometry of the module, it is suitable for the configuration of the membrane being used, as defined in the first aspect, being tubular, flat, or hollow fiber.

To demonstrate the potential of the present disclosure, the embodiments listed above will be described in more detail through embodiment examples and practical examples, as well as the results obtained. It should be noted that the following description is only intended to clarify the understanding of the proposed disclosure and disclose in even more detail the embodiment of the disclosure without limiting it. Therefore, variables similar to the examples are also included in the scope of the disclosure.

EXAMPLES OF EMBODIMENTS

In one process embodiment, the BZ solution is prepared by dissolving commercial benzoxazine (20 to 80%, w/w) in methyl ethyl ketone (20 to 80% w/w) and adding a commercial curing agent (15 to 25% w/w), under magnetic stirring (100 to 400 rpm) and heating (50 to 100 °C.). The polymer solution is degassed in a vacuum oven (100 to 150 °C) for 10 to 45 min. Then, the solution is deposited on a flat support using spin coating at a speed of 100 to 2000 rpm. The support with the polymer solution layer is subjected to solvent evaporation in an oven (30 to 90 °C, for 8 to 24 h) and subsequently crosslinked in an oven, under atmospheric pressure, following the heating protocol: 80 °C. (20 to 60 min), 100 °C. (20 to 60 min), 120 °C. (45 to 90 min), 150 °C. (45 to 90 min), 180 °C. (45 to 90 min), 200 °C. (45 to 120 min), 220 °C. (45 to 120 min) and 250 °C. (45 to 120 min).

In one embodiment of the process, polybenzoxazine is synthesized from the reaction between a phenol (such as resorcinol or cardanol) and an amine (aniline or furfurylamine), in the presence of para-formaldehyde, under mechanical stirring and heating (80 to 150 °C.). The formed benzoxazine monomer can have its viscosity adjusted using a solvent (chloroform or methyl ethyl ketone) and then the solution is spread on a hydrophobic glass plate, or Teflon plate or silicone substrate, with the aid of a spreading knife. The benzoxazine curing process takes place by heating in a convection oven following a heating protocol for 6 hours, with a temperature ramp from 140 °C to 200 °C.

In one embodiment of the process, the supported polymeric membrane and the self-supported polymeric membrane are subjected to the pyrolysis process in order to manufacture the PBZ-derived carbon membrane. The manufactured polymeric membranes are inserted inside a quartz reactor located inside a temperature-controlled tubular furnace. Before starting pyrolysis, a purge is carried out with an inert atmosphere, although any inert gas can be used as a purge gas, as an example, nitrogen can be used at a flow rate of 2 to 3 $L \cdot min^{-1}$. The pyrolysis protocol is carried out in two stages, the first stage taking place with a heating ramp from 90 to 300 °C at a constant heating rate value of 3 $°C \cdot min^{-1}$. Upon reaching the final temperature of 300 °C, this temperature condition is held for a fixed period of 120 min. In the second stage, the system continues to heat at a constant heating rate of 3 °C $min^{-1}$, until the final pyrolysis temperature of 600 °C. The final temperature is maintained for a fixed period of 30 min. At the end of the steps, the controlled cooling process can be carried out at a cooling rate of 5 °C $min^{-1}$, to room temperature, under a nitrogen atmosphere.

In one embodiment of the process, the PBZ carbon membranes are stored in a desiccator containing silica and nitrogen atmosphere until use in the gas permeation system.

In one embodiment of the process, the gas permeation system is composed of a module machined from 310 stainless steel, with flat geometry. The module consists of an upper part, equipped with a side inlet for supplying gases (pure or mixtures) and a side outlet for purging the concentrate stream; a lower part equipped with a side inlet for the drag gas and a side outlet for purging the permeate stream. The upper and lower parts have circular cutouts in which o-rings of suitable diameter are placed, which allow the central part to fit; a central part of tubular shape to which the flat geometry membrane is attached. The module is closed using four screws, which press the o-rings against the bottom of the side parts and against the edge of the central cylinder, causing sealing of the module and the separation of the process streams.

In one embodiment of the process, gas mixtures or pure gases are fed into the module and the gas or gas mixture permeated through the membrane accumulates in a closed chamber. The increased pressure in the permeate chamber is monitored by a pressure transducer.

In one embodiment of the process, the concentrate and permeate stream is injected into a gas chromatograph to analyze its composition.

Practical Examples

Preparation of the Precursor Polymer Solution

PBZ polymeric membranes were prepared by dissolving the commercial benzoxazine (BZ) monomer (Araldite LZ 8291—Huntsman) in methyl ethyl ketone (MEK), at a PBZ/MEK ratio of 40:60, in the presence of the curing agent (HZ 8293, Huntsman). BZ was added to a beaker and maintained under magnetic stirring at 230 rpm at 90 °C for 10 minutes, until the solution was homogenized, and viscosity was reduced. The MEK solvent was added to the solution, under magnetic stirring and heating, for 10 minutes. Afterwards, the curing agent was added (19%, v/v) to the system under stirring at 90 °C for 10 min. After complete solubilization, the solutions were used to prepare flat and supported polymeric membranes.

Preparation of Self-Supporting Polymer Film

The BZ/MEK polymeric solution (10 mL) was spread onto a silicone substrate using a glass rod. The films were dipped in a non-solvent bath composed of distilled water for 72 h. Subsequently, they were subjected to the thermal curing protocol. Self-supported benzoxazine polymeric films were prepared using the casting technique using the polymeric solutions previously described in order to characterize the polymeric material.

Coating of Porous Support with Precursor Polymeric Solution

The supported PBZ membranes were prepared from the deposition of the BZ/MEK polymeric solution on the surface of the flat ceramic support using spin coating. The ceramic support was attached to the equipment and spinned at 1000 rpm. The BZ polymeric solution (1.5 mL) was deposited on the support at a constant speed of 1,000 rpm for 30 seconds, characterizing a coating cycle. Six coating cycles were performed with a 30-second interval between them. Subsequently, the supported polymeric membranes were subjected to heating in an oven at 25 °C for 24 hours to evaporate the solvent and subsequent curing protocol. In order to compare the influence of the number of coatings on the carbon membrane performance, a carbon membrane was prepared with 5 coatings and cured at 150 °C. (MCPBZ-150-5R).

Thermal Curing Protocol

The curing protocol is an essential step in developing a high-quality material with suitable properties for its application. In the present disclosure, five curing protocols were assessed for the development of PBZ-derived carbon membranes. PBZ polymeric membranes and self-supported films were subjected to the pyrolysis protocol in an oven with forced air convection, according to the protocols specified in Table 1.

TABLE 1

Curing protocol for PBZ polymeric membranes.

| Sample | Curing protocol |
|---|---|
| MCPBZ-25 | 25 °C for 3 h |
| MCPBZ-150 | 80 °C for 1 h, 90 °C for 1 h, 100 °C for 30 min, 110 °C for 30 min, 120 °C for 30 min, 130 °C for 30 min, and 150 °C for 1 h. |
| MCPBZ-200 | 80 °C for 1 h, 90 °C for 1 h, 100 °C for 30 min, 110 °C for 30 min, 120 °C for 30 min, 130 °C for 30 min, 150 °C for 1 h, 180 °C for 1 h and 200 °C for 1 h. |
| MCPBZ-220 | 80 °C for 1 h, 90 °C for 1 h, 100 °C for 30 min, 110 °C for 30 min, 120 °C for 30 min, 130 °C for 30 min, 150 °C for 1 h, 180 °C for 1 h, 200 °C for 1 h and 220 °C for 1 h. |
| MCPBZ-250 | 80 °C for 1 h, 90 °C for 1 h, 100 °C for 30 min, 110 °C for 30 min, 120 °C for 30 min, 130 °C for 30 min, 150 °C for 1 h, 180 °C for 1 h, 200 °C for 1 h, 220 °C for 1 h and 250 °C for 1 h. |

Preparation of PBZ-Derived Carbon Membranes

The supported polymeric PBZ films and membranes were subjected to the pyrolysis process to form carbon membranes. The membrane was inserted into a tubular furnace under a controlled atmosphere (inert, $N_2$) at a rate of 2 $mL \cdot min^{-1}$, and the heating protocol at 90 °C was started and maintained for 30 min; the 3 $°C \cdot \cdot min^{-1}$ rate was used until reaching a temperature of 300 °C, which was maintained for 120 min and raised to 600 °C at the same heating rate and maintained at that temperature for 30 min. After heating, the system was cooled at a maximum cooling rate of 5 $°C \cdot \cdot min^{-1}$ up to 100 °C. The flow of $N_2$ was kept constant throughout the pyrolysis process. After preparing the carbon membranes derived from PBZ, they were stored in a desiccator with silica.

Characterization of the Polymer Precursor and the Selective Carbon Layer Derived from PBZ Chemical structures of the polymeric films were characterized by Fourier transform infrared spectroscopy (FTIR). Absorption spectra in the infrared region were obtained by the attenuated total reflection (ATR) module in a Perkin Elmer Frontier spectrometer in the wavenumber range between 4000 and 650 $cm^{-1}$, with 64 scans per spectrum and 4 $cm^{-1}$ resolution.

The polymeric films, precursors to CM, were characterized by thermogravimetric analysis (TGA) on a TA Instruments SDT Q600 equipment with to assess the degradation and thermal stability of the prepared films. Thermal properties of the materials were assessed in the temperature range between 3° and 700 °C, in an inert nitrogen atmosphere (100 $mL \cdot min^{-1}$) with a heating rate of 10 $°C \cdot \cdot min^{-1}$.

The cross-sectional morphology of the carbon membrane and adhesion of the carbon layer on the alumina support were investigated by field emission scanning electron microscopy (FEG-SEM). The samples were fractured with liquid nitrogen and the material fragments were deposited in stubs with a carbon ribbon and metallized with gold. Morphology of the samples was characterized using a scanning electron microscope model Inspect F50-FEI with a working voltage of 20 kV and point resolution of 1.2 nm. Furthermore, verification of polymer intrusion into the ceramic support was carried out based on the elemental analysis mapping of the cross section of the membrane supported on the energy dispersive X-ray analyzer coupled to the MEV-FEG.

Transmission electron microscopy (TEM) analysis was carried out on a Tecnai GM2100F microscope at 200 kV with electron diffraction, to evaluate the microstructure of the PBZ-derived carbon film. The polymeric film in powder form was dispersed in ethyl alcohol using an ultrasonic bath for 20 min. The dispersion was dripped onto the copper grid (300 mesh).

$N_2$ adsorption and desorption analyzes were performed on a pore size analyzer (Nova 4200e, Quantachrome, France) to determine the average pore diameter, size distribution and pore volume of the PBZ-derived carbon films. The carbon samples were degassed at 300 °C for 6 h and the sorption and desorption process took place at 77 K.

Pure Gas Permeation Tests

Performance tests of flat carbon membranes prepared with 6 coating cycles, cured in different curing protocols and pyrolyzed at 600 °C. (MCPBZ-25, MCPBZ-150, MCPBZ-200, MCPBZ-220 and MCPBZ-250) and the flat carbon membrane prepared with 5 coating cycles, cured at 150 °C and pyrolyzed at 600 °C. (MCPBZ-150-6R) were carried out in a flat permeation cell. The system was subjected to vacuum for a period of 20 minutes between the permeation tests carried out with the different gases. To measure the gas flow in polymeric membranes, the constant volume method was used, with the pressure variation signal (dp/dt) being monitored using a pressure transducer connected to a data recording and collection system comprising a FieldLogger model recorder (NOVUS, Brazil) and a computer.

Permeability calculation (P) was carried out using Equation 1 below:

$$P = \frac{V_C l\, T_{CNTP}}{\Delta P\, A\, T_{amb} P_{CNTP}} \left(\frac{dp}{dt}\right) \quad (1)$$

where P is the permeability ($cm^3$ cm $cm^{-2}$ $s^{-1}$ $cmHg^{-1}$ or Barrer, 1 Barrer=$1.10^{-10}$ $cm^3$ cm $cm^2$ $s^{-1}$ $cmHg^{-1}$), $V_c$ is the volume of the permeation cell downstream of the membrane (5.5 $cm^3$), A and 1 are, respectively, the area ($cm^2$) and thickness of the membrane (cm), ΔP is the transmembrane pressure (cmHg), $T_{Amb}$ is the ambient temperature (K), $T_{CNTP}$ (273.15 K) is the temperature and $P_{CNTP}$ (76 cmHg) is the pressure at normal temperature and pressure conditions (CNTP) and dP/dt is the pressure increase rate in the permeate (cmHg $s^{-1}$). Tests were carried out at room temperature, in the range of from 15 to 30 °C, and pressures set between 4 and 7 bar.

Permeation Tests of Gas Mixtures

In order to obtain information about the actual performance of the membrane produced by process, three gas mixtures were permeated, two of them being ternary mixtures composed of ethane, ethylene and $CO_2$ and another binary mixture formed by $CO_2$ and $CH_4$, on an Agilent 8860 GC System gas chromatograph.

To start the gas permeation process, the membrane was inserted into the gas permeation module and vacuum was activated for 20 min to remove any gases present in the equipment. After vacuuming, the module was aligned to the chromatograph. Nitrogen was used as a drag gas in the process. Firstly, this gas was inserted into the permeate of the gas separation module, maintaining a constant flow at atmospheric pressure for 2 min, to clean the chromatograph loop and the connection line between the module and the chromatograph. Afterwards, the permeate outlet and gas injection valve were closed and the permeation process began. A constant pressure of 6 bar was maintained in the feed, with the previously prepared mixture. The permeation process took place until a gauge pressure of 0.2 bar was reached on the permeate side. Afterwards, nitrogen was inserted into the permeate chamber up to a gauge pressure of 1 bar, and then sent for analysis on the chromatograph.

The detector used was of the TCD type (Thermal Conductivity Detector) with two samples for each membrane. Data processing was carried out using the Data Analysis software from Agilent.

Results

Characterization of the Chemical Structure of the Cross-Linked Precursor Polymer at Different Curing Degrees Characterization of the chemical structure and verification of the polymerization/crosslinking (curing process) of the PBZ polymeric membranes were carried out by FTIR. Polymerization of benzoxazine can occur from a heat treatment of the benzoxazine monomer, since the ring opening mechanism is a thermally activated chemical reaction. Chemical structure of the commercial benzoxazine monomer and crosslinked PBZ are presented below:

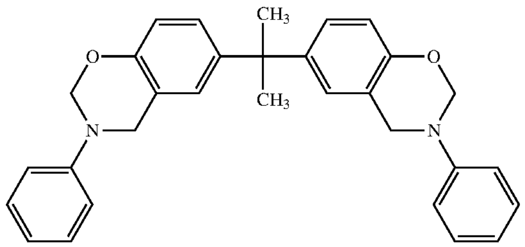

Commercial benzoxazine monomer

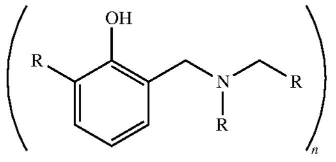

Polybenzoxazine

Figure 4:
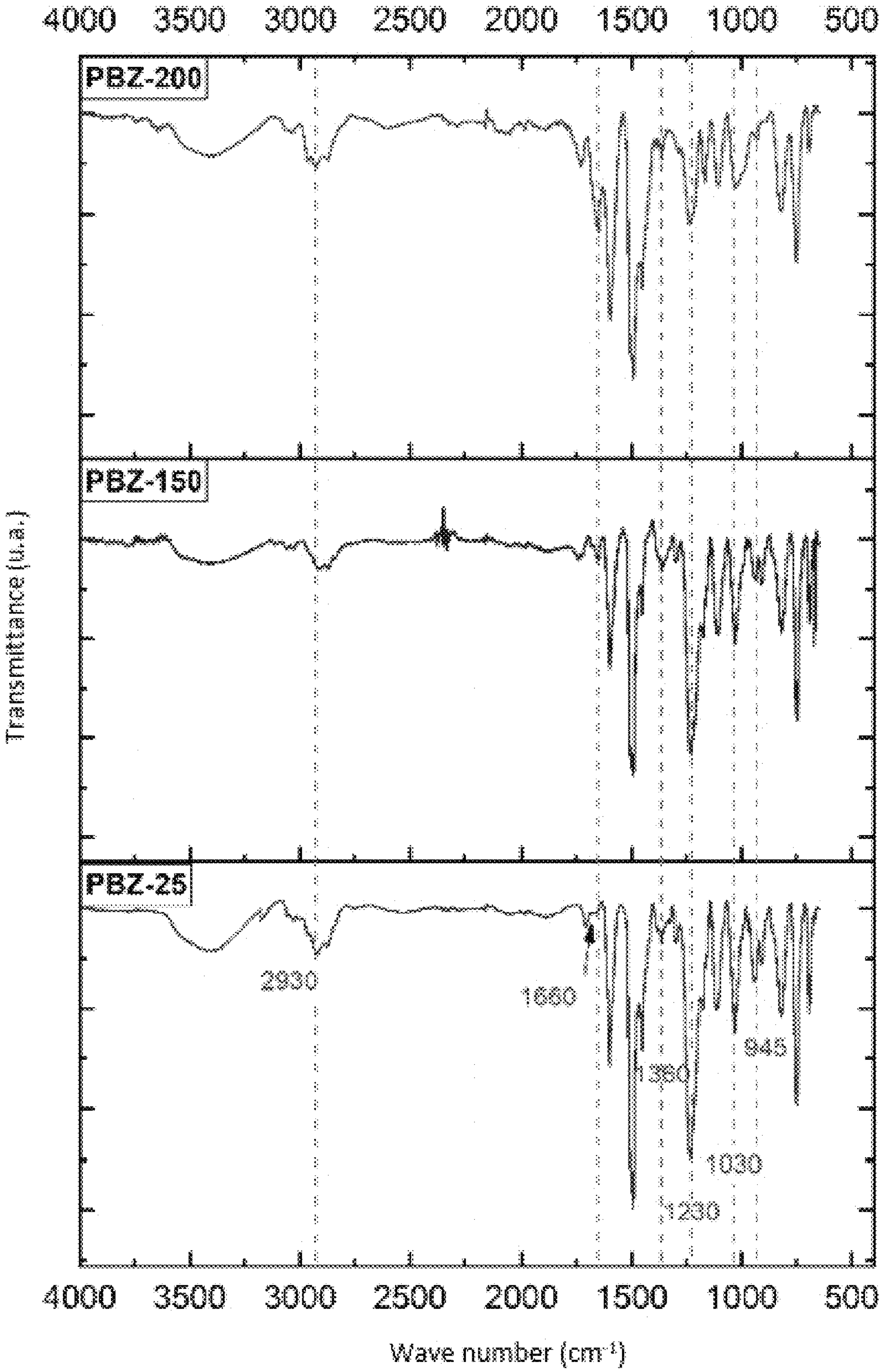
FIG. 4 illustrates the FTIR spectrum of PBZ polymeric films cured at different final temperatures: 25 °C. (PBZ-25), 150 °C. (PBZ-150) and 200 °C. (PBZ-200) according to embodiments of the disclosure.

In the present disclosure, crosslinking of the structure of the polymerized precursor polymer was verified in a well-defined curing protocol with a final temperature of 25, 150 and 200 °C, samples PBZ-25, PBZ-150 and PBZ-200, respectively. The FTIR spectra of the polymeric films are shown in FIG. 4. The polymeric film cured at 25 °C showed characteristic absorption bands of the oxazine ring related to asymmetric and symmetric stretching of C—O—C (aromatic), located at 1230 and 1030 $cm^{-1}$, respectively. Other bands related to the oxazine ring (tri-substituted aromatic ring) were observed in the range between 930 and 980 $cm^{-1}$. Furthermore, the absorption bands at 2930 and 1360 $cm^{-1}$ were related to vibrations of $CH_2$ bonds of the aromatic rings and the stretching of the C—N bond, respectively. Polymerization of benzoxazine using higher temperatures and longer curing protocol can be confirmed from the FTIR spectra. Intensity of the absorption bands located at 1230 and 1030 $cm^{-1}$ and in the range of from 930 to 950 $cm^{-1}$ were reduced, which can be attributed to the oxazine ring opening mechanism that promotes polymerization. Furthermore, there was an intensification of the absorption band at 1660 $cm^{-1}$ related to imine groups, formed by secondary reactions during the cure process. It was noted that the membranes polymerized using a cure protocol with a final temperature of 200 °C showed a higher degree of cure than the other membranes assessed, as their spectra showed greater reduction in the intensity of the absorption bands corresponding to the oxazine ring. The difference in the degree of cure of benzoxazine based on the change in the thermal cure protocol is not reported in the state-of-the-art documents.

Figure 5:
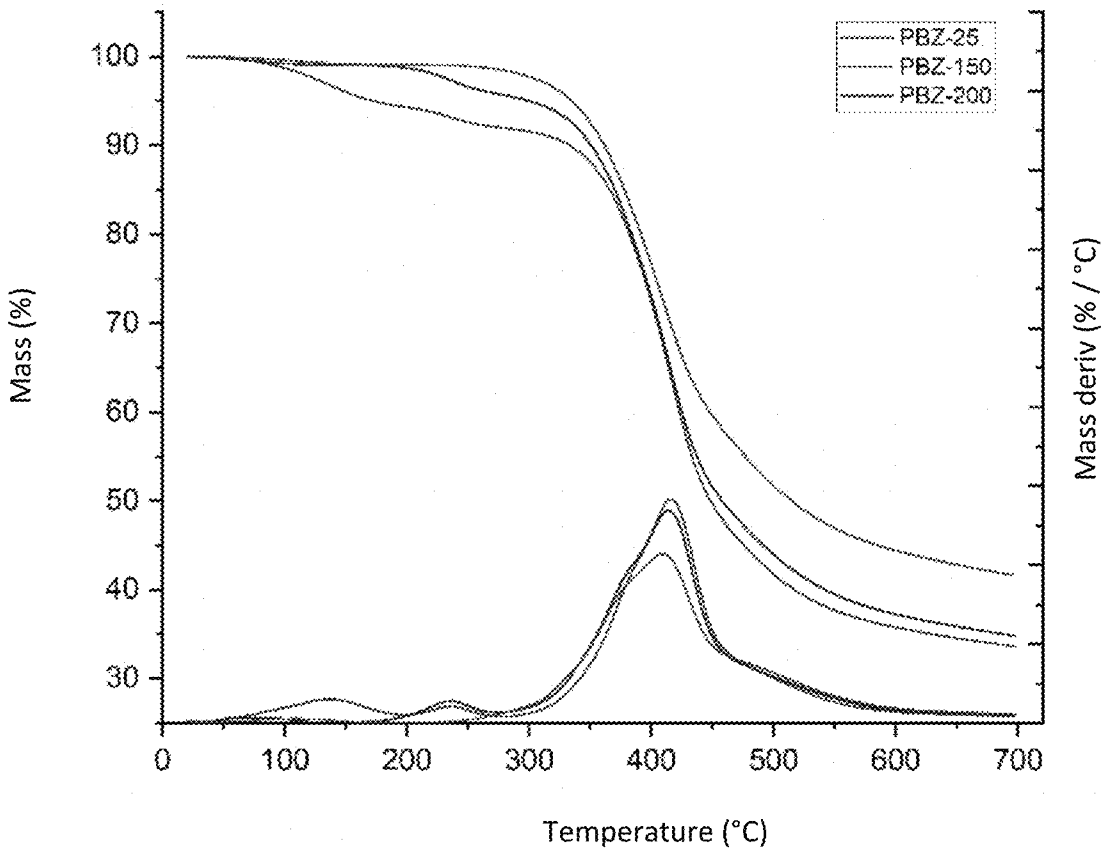
FIG. 5 illustrates the TGA and DTG curves of PBZ polymeric films cured at different final temperatures: 25 °C. (PBZ-25), 150 °C. (PBZ-150) and 200 °C. (PBZ-200) according to embodiments of the disclosure.

Thermal Properties of the Crosslinked Precursor Polymer at Different Cure Degrees thermal properties of PBZ polymer films cross-linked with different curing protocols (PBZ-25, PBZ-150 and PBZ-200) were evaluated by TGA in an inert nitrogen atmosphere, Table 2 and FIG. 5. From the TGA curves and its derivative (DTG), it was possible to verify that all films presented three main regions of mass loss. The initial mass loss, in the range of 20 to 150 °C, is related to the evaporation of water molecules and free solvent. The second region of mass loss between 15° and 300 °C corresponds to the bound solvent, while the third region between 30° and 600 °C is attributed to degradation of the polymer backbone. The different curing processes affected the thermal properties of the precursor polymer, the higher the final curing temperature of the benzoxazine monomer, the greater the thermal stability of the polymer. Furthermore, it was observed that increasing the curing temperature caused a reduction in the percentage of mass loss related to free and bound solvent, in addition to slightly increasing the residue content at 700 °C. These results may be related to the increased crosslinking density of the polymer chain with the increased final temperature of the thermal curing protocol. At this point, it should be highlighted that none of the prior art documents assess or indicate the relationship between the curing protocol and the thermal properties of the precursor polymer.

The residue content after pyrolysis is an important factor for the development of carbon membranes, as it affects the thickness of the selective carbon layer, which is directly related to the permeability of the membrane. The higher the residue content, the greater the final thickness of the carbon membrane.

TABLE 2

Results of thermogravimetric analysis of PBZ polymeric films.

| Sample | Mass loss at 150 °C (%) | Mass loss from 150 to 300 °C (%) | Mass loss from 300 to 600 °C (%) | $T_{max}$ of main chain degradation ( °C) | Residues at 700 °C (%) |
|---|---|---|---|---|---|
| MCPBZ-25 | 4.0 | 4.4 | 57.8 | 417.0 | 33.6 |
| MCPBZ-150 | 0.9 | 4.0 | 55.7 | 414.0 | 34.8 |
| MCPBZ-200 | 0.9 | 1.4 | 53.3 | 409.1 | 41.7 |

Structure and Adhesion of PBZ-Derived Carbon Membrane

Figure 6:
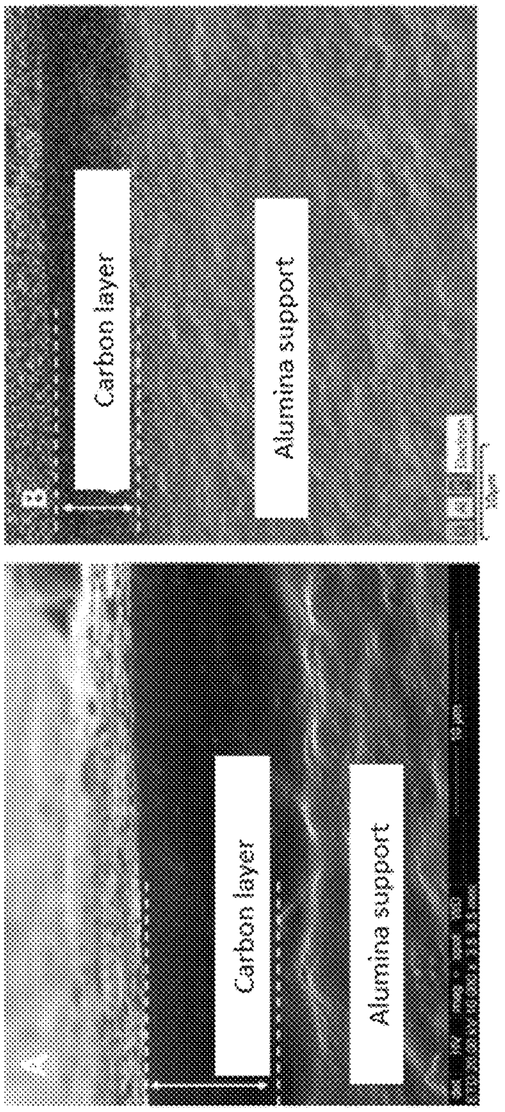
FIG. 6 illustrates in (A) the SEM-FEG image of the cross section of the MCPBZ-150 carbon membrane (cured at a final temperature of 150 °C and pyrolyzed at a final temperature of 600 °C) and in (B) the EDS mapping of the cross section of the supported carbon membrane according to embodiments of the disclosure.

The structure and adhesion of the PBZ-derived selective carbon layer on the flat support was evaluated by SEM-FEG, FIG. 6. The MCPBZ-150 carbon membrane presented a carbon layer apparently free of defects and cracks, with a thickness of about 8 μm and effectively adhered to the flat support, without the presence of any interfacial voids between both materials. EDS spectroscopy was performed to verify the possible intrusion of the precursor polymer into the ceramic support, FIG. 6.B. The EDS mapping image of the MCPBZ-150 cross section showed a significant presence of carbon on the support surface (red color), indicating formation of the carbon layer. Furthermore, minor traces of carbon were identified inside the support, suggesting a low percentage of intrusion of the precursor polymer into the support. These results indicate the potential application of PBZ as a precursor polymer for carbon membranes, since they promoted the formation of a structure suitable for use as a membrane and characterized by a regular, selective surface fully adhered to the support. The prior art documents do not suggest the potential adhesion of the PBZ-based carbon material to a ceramic support, nor do they report the potential formation of a carbon structure free of cracks and defects on the support.

Figure 7:
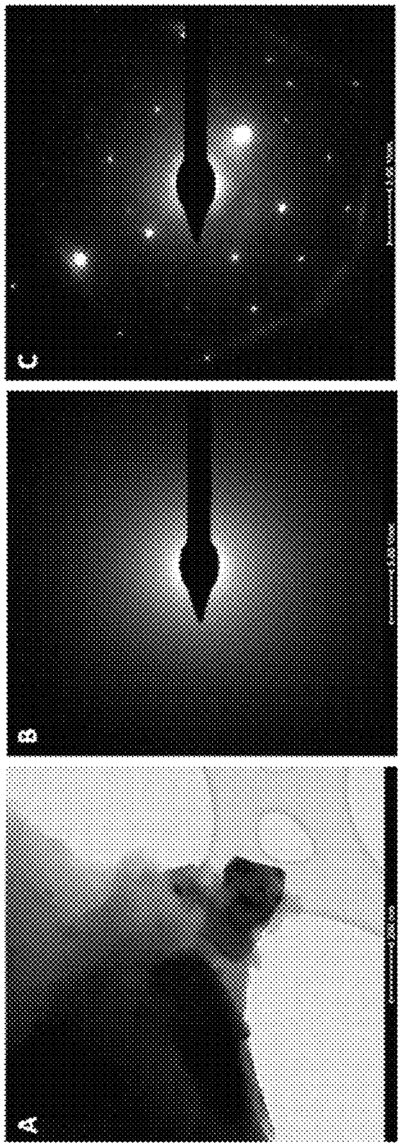
FIG. 7 illustrates in (A) a transmission electron microscopy image of the MCPBZ-200 carbon film (cured at a final temperature of 200 °C and pyrolyzed at a final temperature of 600 °C); in (B) the electron diffraction of the amorphous region and in (C) the electron diffraction of the crystalline region according to embodiments of the disclosure.

Based on transmission electron microscopy analysis combined with electron diffraction of MCPBZ-200, it was possible to verify the presence of disordered and crystalline structures. FIG. 7.A presents a stacked carbon film characterized by a disordered region (FIG. 7.B), responsible for the formation of ultramicropores in the membrane, in addition to a crystalline region (FIG. 7.C) characteristic of a graphitic structure with spacing between sheets of about 0.33 nm. These results indicate that the carbon membrane was effectively prepared, as the CM structure is characterized by regions containing amorphous carbon and small crystalline sites similar to graphene, which form a porous structure called turbostratic. CMs have a bimodal pore size distribution composed of ultramicropores (<7 Å) and micropores (7 to 20 Å). The prior art documents, which report the development of PBZ-derived carbon materials, did not perform TEM characterizations on the material. Furthermore, in these documents, there is no evidence of the formation of ultramicropores in PBZ-based carbon materials, an essential characteristic for gas transport to occur through the molecular sieving mechanism. The aforementioned documents only indicate the presence of micropores in carbon materials.

Characterization of Pores of PBZ-Derived Carbon Membranes

Figure 8:
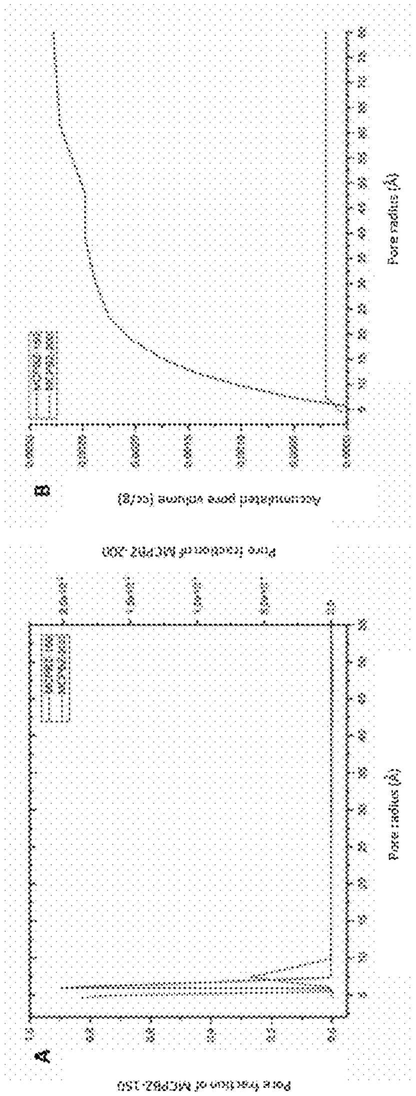
FIG. 8 illustrates in (A) the pore distribution and in (B) the accumulated pore volume for MCPBZ-150 and MCPBZ-200 according to embodiments of the disclosure.

The distribution and volume of accumulated pores for MCPBZ-150 and MCPBZ-200 were verified from $N_2$ sorption and desorption analysis, FIG. 8. According to FIG. 8.A, the MCPBZ-200 and MCPBZ-150 membranes presented predominant pores in the range of micro and ultramicropores, corroborating the electron diffraction results obtained by TEM, FIG. 7. It is observed that changing the curing protocol for the benzoxazine monomer to a higher final temperature caused the formation of pores having a radius of less than 5.5 Å, FIG. 8.A, combined with a smaller pore volume, FIG. 8.B. Furthermore, the average pore size of the membranes was also influenced by the curing protocol, the MCPBZ-200 membrane presented an average pore size of 4.597 Å, while for MCPBZ-150 the value found was 5.949 Å. These results may be related to a change in the free volume of the chemical structure of the precursor polymer, since the degree of polymer crosslinking is related to mobility of the polymer chain. The free volume of the precursor polymer chain directly affects the interplanar spacing between graphene layers of the carbon structures, the greater the free volume, the greater the interplanar spacing. It is worth noting that the state-of-the-art documents related to the development of carbonaceous materials derived from PBZ do not discuss the possibility of controlling pores by adjusting the curing protocol. The referenced documents report that pore adjustments can be carried out using the pyrolysis protocol, differing from the present disclosure.

Pure Gas Permeation Tests

The performance results of PBZ-derived carbon membranes supported in flat configuration are presented in Table 3. According to data analysis, the gas transport properties through CMs derived from PBZ are governed mainly by the molecular sieving mechanism, in which gases having distinct and very close kinetic diameters are separated with high efficiency. It was found that gaseous molecules with smaller kinetic diameter tended to pass through the carbon membrane structure more easily, since their size is smaller than the average pore size of the membrane. Larger gas molecules are retained by the structure, due to the larger kinetic diameter, according to the permeability results presented in Table 3. Furthermore, concomitantly with molecular sieving, the existence of interactions between the chemical structure of CM derived from PBZ (functional groups remaining after pyrolysis) and ethylene gas molecules was noted, promoting greater permeability to this gas compared to the permeability to nitrogen gas, which has a smaller kinetic diameter.

Performance tests of PBZ-derived MCs were carried out on samples prepared in different curing protocols. It was observed that the final curing temperature used in the polymerization of the precursor prepolymer directly affects the transport properties of the material. The higher the curing temperature employed during thermal crosslinking of the benzoxazine monomer, the lower the gas permeability through the membrane. This result may be related to the change in structure caused by the different final curing temperature, which influences the size and volume of pores and the free volume of the precursor polymer, corroborating the results of nitrogen sorption and desorption (FIG. 8). Furthermore, Table 4 shows that the performance tests for PBZ-derived CMs showed high values of ideal selectivity, potential for the separation of gases from emerging industrial processes, such as the separation of byproducts of the oxidative ethane dehydrogenation (ODH) (separation of $CO_2/C_2H_4$, $CO_2/C_2H_6$ e $C_2H_4/C_2H_6$ gas pairs), purification of natural gas ($CO_2/CH_4$), in obtaining nitrogen purified from air ($N_2/CO_2$) and the concentration of oxygen in the air ($O_2/N_2$). Furthermore, based on the selectivity results, it is observed that from a single precursor polymer it is possible to obtain carbon membranes for application in different industrial gas separation processes, since with the appropriate monomer curing protocol, it is possible to adjust the selectivity for the separation of industrial gas pairs of interest. Therefore, these results suggest the potential application of these materials in streams composed of different industrial gases.

TABLE 3

Results of pure gas permeability for carbon membranes prepared with 6 coating cycles, cured in different curing protocols and pyrolyzed at 600 °C.

| Membrane | Permeability (Barrer) He 2.60 Å | $CO_2$ 3.30 Å | $O_2$ 3.46 Å | $N_2$ 3.64 Å | $CH_4$ 3.80 Å | $C_2H_4$ 4.23 Å | $C_2H_6$ 4.42 Å |
|---|---|---|---|---|---|---|---|
| MCPBZ-25 | NP | 504 | 220 | 24 | NP | 15 | 2 |
| MCPBZ-150 | 1016 | 488 | 187 | 12 | NP | 19 | 0.8 |
| MCPBZ-200 | NP | 350 | 154 | 19 | 3 | 10 | 0.4 |
| MCPBZ-220 | 618 | 390 | 163 | 13 | NP | 15 | 2.4 |
| MCPBZ-250 | 49 | 98 | 33 | 5 | NP | 9 | 0.8 |

NP = Permeation test not performed for this gas

TABLE 4

Optimal selectivity results for carbon membranes prepared with 6 coating cycles, cured in different curing protocols and pyrolyzed at 600 °C.

| Membrane | Optimal selectivity $CO_2/C_2H_4$ | $CO_2/C_2H_6$ | $C_2H_4/C_2H_6$ | $CO_2/CH_4$ | $CO_2/N_2$ | $O_2/N_2$ |
|---|---|---|---|---|---|---|
| MCPBZ-25 | 34 | 252 | 8 | NP | 21 | 9 |
| MCPBZ-150 | 26 | 610 | 32 | NP | 41 | 16 |
| MCPBZ-200 | 35 | 875 | 25 | 117 | 19 | 8 |
| MCPBZ-220 | 26 | 162 | 6 | NP | 30 | 13 |
| MCPBZ-250 | 11 | 122 | 11 | NP | 20 | 7 |

NP = Permeation test not performed for this gas

The influence of the number of coating cycles of precursor polymeric solution on the support was also investigated. The carbon membrane prepared with 6 coating cycles, cured at 150 °C and pyrolyzed at 600 °C. (MCPBZ-150) was compared with the carbon membrane prepared using 5 coating cycles, cured at 150 and pyrolyzed at 600 °C. (MCPBZ-150-5R). Membranes with different numbers of coating cycles, Table 5 and Table 6, showed similar gas transport properties, with separation being characterized predominantly by the molecular sieving mechanism and with preferential interaction by ethylene gas. A greater permeation of pure gases is observed through the carbon membrane with fewer coatings (MCPBZ-150-5R), which may be related to the possible reduction in the thickness of the selective layer. Furthermore, the increased permeability of MCPBZ-150-5R as compared to MCPBZ-150 caused a reduction in the ideal selectivity of the gas pairs analyzed.

TABLE 5

Pure gas permeability results for carbon membranes prepared with different numbers of coating cycles.

| Membrane | Permeability (Barrer) He 2.6 Å | $CO_2$ 3.30 Å | $O_2$ 3.46 Å | $N_2$ 3.64 Å | $CH_4$ 3.80 Å | $C_2H_4$ 4.23 Å | $C_2H_6$ 4.42 Å |
|---|---|---|---|---|---|---|---|
| MCPBZ-150 | 1016 | 488 | 187 | 12 | NP | 19 | 0.8 |
| MCPBZ-150-5R | 1276 | 609 | 228 | 16 | NP | 25 | 1.6 |

NP = Permeation test not performed for this gas

TABLE 6

Optimal selectivity results for carbon membranes prepared with different numbers of coating cycles.

| Membrane | Optimal Selectivity $CO_2/C_2H_4$ | $CO_2/C_2H_6$ | $C_2H_4/C_2H_6$ | $CO_2/CH_4$ | $CO_2/N_2$ | $O_2/N_2$ |
|---|---|---|---|---|---|---|
| MCPBZ-150 | 26 | 610 | 32 | NP | 41 | 16 |
| MCPBZ-150-5R | 24 | 380 | 16 | NP | 38 | 14 |

NP = Permeation test not performed for this gas

Permeations of $C_2H_4$ and $C_2H_6$ gases assessed in the present disclosure were not investigated in prior art documents that present the application of PBZ polymeric membranes and PBZ-derived carbon materials in gas separation. In studies on the preparation of polymeric membranes, the transport mechanism of $H_2$, $CO_2$, $O_2$, $CH_4$ and $N_2$ gases was evaluated, which was classified as sorption-diffusion. The state of the art proposes the development of PBZ-modified $SiO_2$ e $ZrO_2$ ceramic-carbon membranes. The molecular sieving mechanism was identified only at the pyrolysis temperature of 750 °C, related to the narrowing of the pores at this temperature. At the pyrolysis temperature of 550 °C, the predominant mechanism was Knudsen diffusion. This difference in gas transportation was attributed to the higher pyrolysis temperature, which allows the complete pyrolytic transformation of, generating a narrowing of the pores and the formation of dense regions. Also, this result was found for a membrane composed of $SiO_2$, $ZrO_2$ and a small percentage of PBZ (0.25%, by mass, of the polymeric solution). Performance tests on gas separation were not carried out for the pure polymer. Therefore, it is not clear whether the molecular sieving is due to the inorganic material or the addition of PBZ. The state of the art, which classifies carbon materials derived from pure PBZ as molecular sieve, does not exemplify performance tests with different gases and does not provide any results demonstrating the presence of a structure containing regions of micro and ultramicropores. In all of the state of the art, there are no findings on the possibility of applying the developed materials for the separation of by-products originating from ethane ODH, olefins/paraffins and the concentration of oxygen in the air. Regarding the separation of olefins and paraffins, the prior art also does not report the interaction between the chemical structure of the PBZ-derived carbon membrane with the ethylene gas molecules, which facilitate permeation of this gas through the membrane.

Permeation Tests of Gas Mixtures

The separation properties of a membrane are best understood when using a synthetic mixture that closely matches the process conditions in which it will be applied. Therefore, permeation tests were carried out with three gas mixtures composed of:

(i) 33% $CO_2$, 31% $C_2H_6$ and 36% $C_2H_4$, (ii) 6.4% $CO_2$, 82.7% $C_2H_6$ and 10.9% $C_2H_4$, (iii) 30% $CO_2$ and 70% $CH_4$. Mixtures composed of $CO_2$, $C_2H_4$ and $C_2H_6$ represent the outlet streams of ethane ODH byproducts and the $CO_2$ and $CH_4$ mixture is related to purification of natural gas.

Ethane ODH consists of an exothermic process and takes place at temperatures below 550 °C, characterizing itself as a highly energy-efficient process with environmental appeal, as it produces fewer amounts of NOx and $CO_2$ gases, which are responsible for the greenhouse effect. However, four possible secondary reactions can occur during ODH of light paraffins, generating byproducts (carbon dioxide and carbon monoxide) that reduce ethane conversion and olefin yield. Therefore, to make ODH viable and competitive, it is necessary to increase selectivity of the separation process based on $CO_2$ and CO separation from $C_2H_4$ and $C_2H_6$.

Permeation tests of gas mixtures were performed on a carbon membrane prepared with 6 coating cycles, cured at 150 °C and pyrolyzed at 600 °C. The actual selectivities for the gas mixtures evaluated are presented in Table 7. These results indicate that the PBZ-derived carbon membrane has potential application for the separation of ethane ODH byproducts and for the purification of natural gas. It is important to highlight that the state of the art does not suggest that the prepared materials can be applied in this industrial process, nor does it present tests and indications for the application of PBZ-based materials in the separation of olefins and paraffins ($C_2H_4$/$C_2H_6$).

TABLE 7

Actual selectivity results for the different gas mixtures assessed.

| Membrane | Mixture composition (%) | | | | Actual selectivity | | | |
|---|---|---|---|---|---|---|---|---|
| | $CO_2$ | $C_2H_6$ | $C_2H_4$ | $CH_4$ | $CO_2$/ $C_2H_6$ | $CO_2$/ $C_2H_4$ | $C_2H_4$/ $C_2H_6$ | $CO_2$/ $CH_4$ |
| MCPBZ-150-I | 33 | 31 | 36 | NP | 50 | 11 | 4 | NP |
| MCPBZ-150-II | 6.4 | 82.7 | 10.9 | NP | 92 | 9 | 10 | NP |
| MCPBZ-150-III | 30 | NP | NP | 70 | NP | NP | NP | 104 |

NP = Permeation test not performed for this gas

Example 1

Polymeric solutions of commercial benzoxazine prepolymer (BZ), methyl ethyl ketone (MEK) and curing agent (HZ 8293, with confidential formulation) were prepared to be used as flat supported membranes. In a beaker, BZ (30 mL) was added and maintained under magnetic stirring at 230 rpm at 90 °C for 10 min, until the solution was homogenized and viscosity was reduced. MEK solvent (12 mL) was added to the solution under magnetic stirring and heating for 10 min. Then, the curing agent (5.7 mL) was added to the system under stirring at a temperature of 90 °C for 10 min. After complete solubilization, the solutions were used to prepare supported polymeric membranes. The supported membranes were prepared by deposition of the prepared polymeric solution on a flat alumina support using spin coating. The ceramic support was attached to the equipment and spinned at 1000 rpm. The BZ polymeric solution (1.5 mL) was deposited on the support at a constant speed of 1,000 rpm for 30 s, this procedure consisted of a coating cycle. This step was repeated 4 times, totaling 5 coating cycles. Subsequently, the supported polymeric membranes were subjected to heating in an oven at 25 °C for 24 h to evaporate the solvent.

The supported PBZ polymeric membranes were subjected to the thermal curing process according to the following heating protocol: 80 °C for 30 min, 90 °C for 30 min, 100 °C for 30 min, 110 °C for 30 min, 120 °C for 30 min, 130 °C for 30 min, 150 °C for 60 min, 180 °C for 60 min and 200 °C for 90 min.

Formation of the PBZ-derived carbon molecular sieve membrane was carried out through the controlled thermal decomposition process, the so called pyrolysis process. The ceramic support coated with the PBZ polymeric solution crosslinked at 200 °C was inserted into a quartz reactor located inside a temperature-controlled tubular furnace. Prior to the start of pyrolysis, a purge was carried out with an inert nitrogen atmosphere at a flow rate of 2 L·min$^{-1}$. The pyrolysis protocol was carried out in two steps, the first one taking place on a heating ramp from 90 to 300 °C. 1, with a constant heating rate value of 3 °C··min$^{-1}$, upon reaching the final temperature of 300 °C, this temperature condition can be maintained for a fixed period of up to 120 min. In the second stage, the system continues to heat at a constant heating rate of 3 °C··min$^{-1}$, until the final pyrolysis temperature of 500 °C. The final temperature was maintained for a fixed period of 30 min. At the end of the steps, the controlled cooling process was carried out at a maximum cooling rate of 5 °C··min$^{-1}$, up to a temperature of 30 °C, under a nitrogen atmosphere.

The PBZ-derived carbon membranes were stored in a desiccator containing silica until use in the gas permeation system.

Gas permeation took place in a gas permeation system made of a module machined from 310 stainless steel, with flat geometry. The module consists of an upper part, equipped with a side inlet for supplying gases and a side outlet for purging the concentrate stream; a lower part equipped with a side inlet for the drag gas and a side outlet for purging the permeate stream. The upper and lower parts have circular cutouts in which o-rings of suitable diameter are placed, which allow the central part to fit; a central part of tubular shape to which the flat geometry membrane is attached. The module is carried using four screws, which press the o-rings against the bottom of the side parts and against the edge of the central cylinder, causing sealing of the module and the separation of the process streams. The gas permeated through the membrane accumulates in a closed chamber and the increase in pressure in this chamber is monitored by a pressure transducer. To assess the performance of the developed membranes, pure gases He, $CO_2$, $O_2$, $N_2$, $CH_4$, $C_2H_4$ and $C_2H_6$ and results of the permeation tests are presented in Table 8.

TABLE 8

Gas permeabilities and selectivities of gas pairs obtained for a PBZ-derived carbon membrane (MCPBZ-5R/200-500) manufactured from the deposition of 5 layers of polymeric solution on a flat ceramic support and with final curing and pyrolysis temperatures equal to 200 °C and 600 °C, respectively.
MCPBZ-5R/200-500

| Pure gas | Kinetic diameter | Permeance (GPU) | Gas pairs | Optimal selectivity |
|---|---|---|---|---|
| He | 2.60 Å | 14 | $CO_2/N_2$ | 18 |
| $CO_2$ | 3.30 Å | 16 | $CO_2/CH_4$ | 40 |
| $O_2$ | 3.46 Å | 6 | $CO_2/C_2H_4$ | 27 |
| $N_2$ | 3.64 Å | 0.9 | $CO_2/C_2H_6$ | 160 |
| $CH_4$ | 3.80 Å | 0.4 | $O_2/N_2$ | 7 |
| $C_2H_4$ | 4.23 Å | 0.6 | $C_2H_4/C_2H_6$ | 6 |
| $C_2H_6$ | 4.42 Å | 0.1 | | |

1 GPU = $3.35 \times 10^{-10}$ mol $m^{-2}$ $s^{-1}$ $Pa^{-1}$

Example 2

In example 2, a PBZ-derived carbon membrane was manufactured according to the methodology described in example 1 with modifications to the curing protocol and the final pyrolysis temperature of the membrane. The PBZ-derived carbon membrane of example 2, designated as MCPBZ-5R/150-600, was prepared according to the following curing protocol: 80 °C for 30 min, 90 °C for 30 min, 100 °C for 30 min, 110 °C for 30 min, 120 °C for 30 min, 130 °C for 30 min and 150 °C for 60 min. The final pyrolysis temperature was 600 °C. To assess the performance of the developed membranes, pure gases He, $CO_2$, $O_2$, $N_2$, $CH_4$, $C_2H_4$ and $C_2H_6$ and results of the permeation tests are presented in Table 9.

TABLE 9

Gas permeabilities and selectivities of gas pairs obtained for a PBZ-derived carbon membrane (MCPBZ-5R/150-600) manufactured from the deposition of 5 layers of polymeric solution on a flat ceramic support and with final curing and pyrolysis temperatures equal to 150 °C and 600 °C, respectively.
MCPBZ-5R/150-600

| Pure gas | Kinetic diameter | Permeance (GPU) | Gas pairs | Selectivity |
|---|---|---|---|---|
| He | 2.60 Å | 157 | $CO_2/N_2$ | 38 |
| $CO_2$ | 3.30 Å | 75 | $CO_2/CH_4$ | 375 |
| $O_2$ | 3.46 Å | 28 | $CO_2/C_2H_4$ | 25 |
| $N_2$ | 3.64 Å | 2 | $CO_2/C_2H_6$ | 375 |
| $CH_4$ | 3.80 Å | 0.2 | $O_2/N_2$ | 14 |
| $C_2H_4$ | 4.23 Å | 3 | $C_2H_4/C_2H_6$ | 15 |
| $C_2H_6$ | 4.42 Å | 0.2 | | |

1 GPU = $3.35 \times 10^{-10}$ mol $m^{-2}$ $s^{-1}$ $Pa^{-1}$

Comparative Examples 1 and 2

The PBZ-derived carbon membranes of comparative examples 1 and 2 showed similar gas transport properties, with the separation being characterized mainly by the molecular sieving mechanism. In these separation processes, gases with different kinetic diameters can be effectively separated, according to values obtained from selectivities to the evaluated industrial gas pairs. Furthermore, both membranes showed greater permeance through the membrane of ethylene gas molecules ($C_2H_4$) than methane gas molecules ($CH_4$), which has a smaller kinetic diameter. This result can be related to the interaction of the remaining functional groups in the structure of the carbon membrane with ethylene gas molecules. Comparing examples 1 and 2, a greater permeation of pure gases is observed through the carbon membrane described in example 2, which may be related to the change in structure caused by the different final curing temperature (the CM in example 1 was crosslinked at 200 °C, while the CM of example 2 was crosslinked at 150 °C) and by the possible reduction in thickness of the selective carbon layer with the increase in final pyrolysis temperature (final pyrolysis temperature equal to 500 and 600 °C for examples 1 and 2, respectively).

Example 3

In example, 3 PBZ-derived carbon membranes were manufactured according to the methodology described in example 1, but with 6 cycles of coating with polymeric solution on the flat ceramic support and with different curing protocols and a final pyrolysis temperature equal to 600 °C. Membranes designated MCPBZ-6R/25-600, MCPBZ-6R/150-600, MCPBZ-6R/200-600, MCPBZ-6R/220-600 and MCPBZ-6R/250-600 were prepared.

The curing protocols used to manufacture the CM in this example are described below:

MCPBZ-6R/25-600—25 °C for 72 h.

MCPBZ-6R/150-600—80 °C for 30 min, 90 °C for 30 min, 100 °C for 30 min, 110 °C for 30 min, 120 °C for 30 min, 130 °C for 30 min and 150 °C for 60 min.

MCPBZ-6R/200-600—80 °C for 30 min, 90 °C for 30 min, 100 °C for 30 min, 110 °C for 30 min, 120 °C for 30 min, 130 °C for 30 min, 150 °C for 60 min, 180 °C for 60 min and 200 °C for 90 min.

MCPBZ-6R/220-600—80 °C for 30 min, 90 °C for 30 min, 100 °C for 30 min, 110 °C for 30 min, 120 °C for 30 min, 130 °C for 30 min, 150 °C for 60 min 180 °C for 60 min and 200 °C for 90 min and 220 °C for 60 m.

MCPBZ-6R/250-600—80 °C for 30 ml 90 °C for 30 min, 100 °C for 30 min, 110 °C for 30 min 120 °C for 30 min 130 °C for 30 ml, 150 °C for 60 min, 180 °C for 60 min and 200 °C for 90 min, 220 °C for 60 min and 250 °C for 30 min.

To assess the performance of the developed membranes, pure gases $CO_2$, $O_2$, $N_2$, $C_2H_4$ and $C_2H_6$ were used, and results of the permeation tests are presented in Tables 10 and 11.

TABLE 10

Permeabilities of pure gases through PBZ-derived carbon membranes manufactured from the deposition of 6 layers of polymeric solution on the flat ceramic support and different curing temperatures, as described in the table, and a final pyrolysis temperature of 600 °C.

| Membrane | Maximum curing temperature (°C) | Permeability (Barrer) $CO_2$ | $O_2$ | $N_2$ | $C_2H_4$ | $C_2H_6$ |
|---|---|---|---|---|---|---|
| MCPBZ-6R/25-600 | 25 | 504 | 220 | 24 | 15 | 2 |
| MCPBZ-6R/150-600 | 150 | 488 | 187 | 12 | 19 | 0.8 |
| MCPBZ-6R/200-600 | 200 | 350 | 154 | 19 | 10 | 0.4 |
| MCPBZ-6R/220-600 | 220 | 390 | 163 | 13 | 15 | 2.4 |
| MCPBZ-6R/250-600 | 250 | 98 | 33 | 5 | 9 | 0.8 |

Selective carbon layer thickness = ±8 μm
1 Barrier = $3.35 \times 10^{-16}$ mole m $m^{-2}$ $s^{-1}$ $Pa^{-1}$

TABLE 11

Selectivity to gas pairs obtained from carbon membranes derived from PBZ manufactured from the deposition of 6 layers of polymeric solution on the flat ceramic support and different curing temperatures, as described in the table, and a final pyrolysis temperature of 600 °C.

| Membrane | Maximum curing temperature (°C) | Optimal selectivity $CO_2/N_2$ | $CO_2/C_2H_4$ | $CO_2/C_2H_6$ | $O_2/N_2$ | $C_2H_4/C_2H_6$ |
|---|---|---|---|---|---|---|
| MCPBZ-6R/25-600 | 25 | 21 | 34 | 207 | 9 | 6 |
| MCPBZ-6R/150-600 | 150 | 40 | 26 | 600 | 15 | 23 |
| MCPBZ-6R/200-600 | 200 | 19 | 36 | 860 | 8 | 24 |
| MCPBZ-6R/220-600 | 220 | 30 | 26 | 160 | 13 | 6 |
| MCPBZ-6R/250-600 | 250 | 20 | 11 | 120 | 7 | 11 |

The PBZ-derived carbon membranes presented in example 3 showed that the main gas transport mechanism is molecular sieving and that there is an interaction between the chemical structure of the CM and the ethylene gas molecules. The curing protocol used in the development stage of the polymeric membrane influences the permeability of gases and the selectivity of the gas pairs assessed. Furthermore, it is observed that performance tests for PBZ-derived CM showed efficient selectivities for industrial gas separation processes.

The invention claimed is:

1. A process for preparing polybenzoxazine (PBZ)-derived carbon membranes, the process comprising:

i. preparing a precursor polymer solution;

ii. coating a porous support with the precursor polymer solution or spreading the precursor polymer solution on a substrate to prepare one or more supported or self-supported membranes;

iii. crosslinking a polymeric chain based on a benzoxazine monomer curing protocol;

iv. controlling a thermal decomposition protocol of one or more crosslinked membranes; and v. storing the one or more crosslinked membranes.

2. The process of claim 1, wherein in step (i) the polymer solution includes polybenzoxazine (PBZ), and wherein the polybenzoxazine (PBZ) comprises a synthetic or a derivation from renewable sources.

3. The process of claim 1, wherein in step (i) the polymeric solution is prepared, with or without heating, by dissolving BZ in an organic solvent or from the synthesis of PBZ using a phenol, an amine, and an aldehyde.

4. The process of claim 3, wherein the organic solvent comprises methyl ethyl ketone, chloroform, n-methyl-2-pyrrolidone, hexane, dimethylacetamide, dimethylformamide, or toluene, or mixtures thereof to solubilize the polymer.

5. The process of claim 3, wherein a compound from a renewable source comprises (a) one or more of lignin, resveratrol, eugenol, guaiacol, catechol or vanillin is used as phenol, or (b) synthetic phenolic compounds comprising one or more of bisphenol A, bisphenol f, resorcinol, trihydric phenol, or 2-aminophenol is used as phenol.

6. The process of claim 3, wherein one or more of aniline, furfurylamine, ethylenediamine, curarin, octafecilamine, triethylamine, or methylenedianiline is used as an amine, and wherein one or more of benzaldehyde, valeraldehyde, or dimethylformaldehyde is used as aldehyde.

7. The process of claim 2, wherein in step (i) a curing agent is added in concentrations between 5 and 30% (w/w) to increase crosslinking density of a PBZ polymer chain.

8. The process of claim 2, wherein in step (i) an organic solvent is added to control viscosity of the benzoxazine polymeric solution.

9. The process of claim 1, wherein in step (i) the concentration of the polymeric solution relates to thickness of a desired selective layer between 5 and 80% (w/w) polymer.

10. The process of claim 1, wherein in step (i) after preparation, the polymeric solution is subjected to an ultrasonic bath or vacuum, with or without heating to eliminate bubbles.

11. The process of claim 1, wherein the polymeric solution obtained in step (i), with or without curing agent, is used in manufacture of the supported or self-supported membranes, and wherein the membranes comprise a flat, tubular, or hollow fiber configuration.

12. The process of claim 1, wherein in step (ii) the polymeric solution is used to cover a non-selective porous support, wherein the support has a flat or tubular shape and is manufactured in one or more of alumina, silicon carbide, metallic material, with or without adding additives, or non-woven fabrics.

13. The process of claim 1, wherein in step (ii) the polymeric solution is used to deposit the polymeric solution on tubular supports, and wherein deposition is carried out on an inner or an outer surface of the tubular supports.

14. The process of claim 1, wherein step (ii) includes coating on flat or tubular supports and is carried out by dip coating or spin coating.

15. The process of claim 14, wherein in dip coating, the ends of porous ceramic tubes are capped, wherein the tubes are slowly dipped into the polymeric solution for a predetermined time of between 30 and 600 seconds, wherein subsequently, the tubular ceramic supports are slowly removed from the precursor polymeric solution, wherein the tubes covered with a polymeric layer is optionally subjected to a new coating cycle, which varies between 0 and 5 additional cycles, wherein coating is carried out at room temperature or at a controlled temperature, and wherein the membranes are dried at room temperature or at a controlled temperature until a solvent evaporates.

16. The process of claim 14, wherein in spin coating, the polymeric solution is deposited onto the surface of a support attached to a rod or base with a constant rotational angular speed ranging from 100 to 2000 rpm, wherein coating is carried out at room temperature or inside a temperature-controlled oven, and wherein the membranes are dried at room temperature or in a temperature-controlled oven until a solvent evaporates.

17. The process of claim 1, wherein in step (iii) the membranes are formed through the crosslinking, wherein benzoxazine polymerizes by opening of an oxazine ring, and wherein the crosslinking process is thermal, chemical or by ultraviolet radiation, with or without additional catalysts or additives.

18. The process of claim 17, wherein additional catalysts or additives are selected from the group consisting of: polyaniline, 2,4-Di-tert-butylphenol, metal diethyl dithiocarbamates, tetramethylthiuram disulfide, zinc stearate, sulfur, thiols, ammonium salt, metal complexes of acetylacetonates, cyanuric chloride, Lewis acids, imidazoles, alkylenic acids, cyanate esters, p-toluenesulfonic acid, 2-ethyl-4-methylimidazole, adipic acid, and strong bases.

19. The process of claim 17, wherein in the thermal crosslinking, the polymeric membrane is subjected to heat treatment in a convection/air circulation or drying oven, in a temperature range of 80 and 350 °C, for a pre-established time of between 3 and 12 hours by using a stepwise increase in temperature at intervals ranging from 10 to 50 °C, with isothermal levels of 15 to 120 min.

20. The process of claim 1, wherein in step (iii) the curing protocol promotes thermal adjustment of the final properties of the PBZ polymeric membranes, and wherein the benzoxazine monomers exhibit thermoplastic behavior and become thermoset.

21. The process of claim 20, wherein for the curing protocol, the cationic reaction of oxazine ring opening takes place, thereby to cause chain polymerization and formation of crosslinked structures.

22. The process of claim 21, wherein the greater the degree of curing, the greater the percentage of polybenzoxazine structures distinguished by the open ring structure.

23. The process of claim 22, wherein the pressure of the curing process is between 1 and 100 atm.

24. The process of claim 1, wherein in step (iv) from the thermal decomposition protocol of the self-supported or supported polymeric membrane, a thin and homogeneous PBZ carbon selective membrane is formed.

25. The process of claim 24, wherein the thermal decomposition protocol is carried out under vacuum or in an inert atmosphere comprising nitrogen, argon, helium, or mixtures thereof, or an oxidizing atmosphere is used in the first stages of pyrolysis up to a temperature of 400 °C.

26. The process of claim 25, wherein before the start of pyrolysis, a purge is carried out with the atmosphere used in the process and the prepared membrane is inserted into a quartz reactor located inside a temperature-controlled oven.

27. The process of any one of claim 26, wherein the thermal decomposition protocol is carried out in two stages, and wherein the first stage takes place on a heating ramp from 90 to 300 °C, with a constant heating rate value between 1 and 10 $°C \cdot min^{-1}$, upon reaching the final temperature of the first stage, this temperature condition is maintained for a fixed period of up to 120 min, and in the second stage the system continues to heat at a constant heating rate between 1 and 10 $°C \cdot min^{-1}$, until the final pyrolysis temperature, which is between 300 and 1000 °C.

28. The process of claim 27, wherein the first step is carried out in an oxidizing atmosphere.

29. The process of claim 22, wherein the curing process is carried out at atmospheric pressure.

30. The process of claim 27, wherein a pore activation step in an oxidizing atmosphere between 600 and 1000 °C is carried out.

31. The process of claim 27, wherein at the end of the thermal decomposition protocol a controlled cooling process is carried out at a cooling rate of up to 10 $°C \cdot min^{-1}$, down to room temperature, under the atmosphere used in the pyrolysis process, and cooling is carried out naturally, without controlling the cooling rate.

32. The process of claim 1, wherein in step (v) the membranes are stored in a desiccator with silica and in an ambient, oxidizing, vacuum, inert, or wet or dry atmosphere.

33. A method of use of a PBZ-derived carbon membrane produced by the process of claim 1, the method comprising gas separating from a feed stream composed of different gas molecules having different or similar kinetic diameters.

34. The method of claim 33, wherein the method takes place through a molecular sieving mechanism and separates industrial gases that have different or similar kinetic diameters.

35. The method of claim 33, wherein gas molecules comprise $C_2H_4$, $C_2H_6$, $C_3H_6$, $C_3H_8$, $H_2S$, $CO_2$, $CH_4$, $O_2$, $N_2$, He, $H_2$, or mixtures thereof.

36. The method of claim 33, wherein the membrane is used in:

industrial gas separation systems including $C_2H_4/C_2H_6$, $C_3H_6/C_3H_8$, $CO_2/CH_4$, $O_2/N_2$, $CO_2/N_2$, $H_2/N_2$, $H_2S/CH_4$, or separation of olefins from a gas stream containing $C_2H_6$, $C_3H_8$, $CO_2$, CO, $CH_4$, or $N_2$.

37. A permeation module comprising the PBZ-derived carbon membrane produced by the process of claim 1, and an enclosure capable of allowing operation of the membrane under temperature and pressure conditions as well as in a geometry configured for operation of the membrane.

38. The module of claim 37, wherein the module comprises a flat, tubular or hollow fiber configuration, and wherein the module is composed of three main parts: the central body of the module machined in stainless steel, which contains the membrane and two parts at opposite ends, equipped with openings for coupling the feed, concentrate, drag gas and permeate streams.

39. The module of claim 37, wherein module sealing and membrane fixation occur through the use of o-rings and gaskets, and inside the module, the feed stream is contacted with the PBZ-derived carbon membrane self-supported or deposited on a support, the permeate stream results from gases that permeate the surface of the membrane.

* * * * *